(12) United States Patent
Yokoyama et al.

(10) Patent No.: US 8,121,156 B2
(45) Date of Patent: Feb. 21, 2012

(54) SOLID-STATE LASER DEVICE AND IMAGE DISPLAY DEVICE

(75) Inventors: Toshifumi Yokoyama, Osaka (JP); Kiminori Mizuuchi, Ehime (JP); Tetsuro Mizushima, Osaka (JP); Tatsuo Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 106 days.

(21) Appl. No.: 12/682,378

(22) PCT Filed: Oct. 3, 2008

(86) PCT No.: PCT/JP2008/002790
§ 371 (c)(1),
(2), (4) Date: Apr. 9, 2010

(87) PCT Pub. No.: WO2009/047888
PCT Pub. Date: Apr. 16, 2009

(65) Prior Publication Data
US 2010/0238959 A1    Sep. 23, 2010

(30) Foreign Application Priority Data
Oct. 10, 2007    (JP) .................................. 2007-264278

(51) Int. Cl.
*H01S 3/10*    (2006.01)
(52) U.S. Cl. ................ 372/21; 372/22; 372/70; 372/71; 372/72; 372/105
(58) Field of Classification Search .................... 372/21, 372/22, 70, 71, 72, 105
See application file for complete search history.

(56) References Cited

U.S. PATENT DOCUMENTS 5,243,611 A * 9/1993 Hyuga et al. .................... 372/22
(Continued)

FOREIGN PATENT DOCUMENTS

| JP | 6-260713 | 9/1994 |
|----|----------|--------|
| JP | 6-296054 | 10/1994 |
| JP | 3222288  | 8/2001 |

(Continued)

OTHER PUBLICATIONS

International Search Report issued Oct. 28, 2008 in International (PCT) Application No. PCT/JP2008/002790.

*Primary Examiner* — Yuanda Zhang
(74) *Attorney, Agent, or Firm* — Wenderoth, Lind & Ponack, L.L.P.

(57) ABSTRACT

A semiconductor laser light source emits a laser beam for pumping. An optical resonator includes a solid laser crystal to be excited by the incident of a laser beam to oscillate a fundamental wave and a pair of fundamental wave reflective coats arranged at the opposite sides of the solid laser crystal. A wavelength conversion element converts the fundamental wave into a plurality of harmonics. The wavelength conversion element is so arranged in the optical resonator that the optical axis of at least one of the plurality of harmonics, generated in the optical resonator is made different from that of the fundamental wave and the at least one harmonic whose optical axis is made different is output substantially in the same direction as the other harmonic. By this construction, it is possible to stabilize a harmonic output and utilize a plurality of harmonics without increasing the number of parts.

7 Claims, 19 Drawing Sheets

U.S. PATENT DOCUMENTS

| | | | |
|---|---|---|---|
| 5,357,533 A * | 10/1994 | Mizuuchi et al. | 372/22 |
| 5,588,014 A * | 12/1996 | Okazaki et al. | 372/22 |
| 5,636,232 A | 6/1997 | Goto | |
| 5,652,757 A * | 7/1997 | Okazaki et al. | 372/22 |
| 6,373,865 B1 * | 4/2002 | Nettleton et al. | 372/10 |
| 6,839,365 B1 * | 1/2005 | Sonoda et al. | 372/22 |
| 7,545,837 B2 | 6/2009 | Oka | |
| 2005/0238071 A1 | 10/2005 | Oka | |
| 2007/0053388 A1 * | 3/2007 | Mizuuchi | 372/21 |

FOREIGN PATENT DOCUMENTS

| | | |
|---|---|---|
| JP | 2006-100772 | 4/2006 |
| JP | 2006-186071 | 7/2006 |
| JP | 2007-73552 | 3/2007 |
| WO | WO 2006112303 A1 * | 10/2006 |
| WO | WO 2007026510 A1 * | 3/2007 |

\* cited by examiner

US 8,121,156 B2

SOLID-STATE LASER DEVICE AND IMAGE DISPLAY DEVICE

FIELD OF THE INVENTION

The present invention relates to an internal resonator type solid-state laser device using a solid laser crystal and a wavelength conversion element, and an image display device using the solid-state laser device.

BACKGROUND TECHNOLOGY

A solid-state laser device excited by a semiconductor laser for causing laser oscillation by exciting a solid laser crystal by a laser beam from a semiconductor laser light source, has characteristics of having a small size, a light weight, a long life, and a high electrical/optical conversion efficiency, a stable operation and the like and is used in various industrial fields.

FIG. 18 is a diagram showing the construction of a conventional internal resonator type solid-state laser device 101 excited by a semiconductor laser. A pump beam 119 having a wavelength of about 808 nm and emitted form a semiconductor laser light source 110 passes through a wavelength locking device 112 and is incident on a solid laser crystal 115 via a coupling lens system 113 after being collimated substantially to a parallel beam by a collimator lens 111. A reflecting mirror 116 for a fundamental wave is formed on one end surface of the solid laser crystal 115.

A fundamental wave 120 having a wavelength of about 1064 nm is output from the solid laser crystal 115 excited by the pump beam. The fundamental wave 120 oscillates in an internal optical resonator formed by a reflection coating 123 formed on an output mirror 117 and the reflecting mirror 116. This fundamental wave 120 is incident on a wavelength conversion element 118 made of a nonlinear optical medium, whereby second harmonic components (harmonics 121, 122) of the fundamental wave 120 are generated. The generated harmonics 121, 122 are emitted to the outside via the output mirror 117.

If such a solid-state laser device is used, a high-output green beam can be obtained. As a specific construction example, a solid laser crystal made of, e.g. Nd:YVO$_4$ is excited using, for example, a semiconductor laser light source to induce laser oscillation of the solid laser crystal between a reflecting mirror and an output mirror. By this laser oscillation, a fundamental wave having a wavelength of 1064 nm is obtained. This fundamental wave is incident on a wavelength conversion element, whereby a second harmonic having a wavelength of 532 nm is obtained. Since a high-output green beam can be obtained by employing such a construction, this solid-state laser device can be applied to a display or the like using a laser, wherefore developments on this are being actively made.

FIG. 19 is a diagram showing a schematic construction of a conventional image display device. An image display device 201 is provided with a red light source 202, a green light source 203 and a blue light source 204. The red and blue light sources are constructed by semiconductor lasers. The green light source is constructed by an internal resonator type solid-state laser device excited by a semiconductor laser. Laser beams output from the respective light sources pass through a uniformizing optical system 205 to be incident on a polarization beam splitter 207 after being reflected by a dichroic mirror 210. Thereafter, the polarization beam splitter 207 reflects the laser beams toward an image conversion device. A reflective liquid crystal panel 206 is used in the image conversion device. The laser beams incident on the reflective liquid crystal panel 206 are reflected in accordance with a video signal and pass through an exit lens 208 to be output as a video image.

The outputs of the respective light sources are controlled by a control circuit 209. The image display device 201 also includes a battery 211 and can be battery driven. By using the lasers as the light sources, increased color reproducibility, instantaneous start-up, miniaturization of the device can be realized as compared with a conventional device using lamps.

Several technologies have also been proposed for output stabilization of a semiconductor laser excited solid-state laser device. In the internal resonator type semiconductor laser excited solid-state laser device shown in FIG. 18, an output may become unstable due to the re-incidence of harmonics on the wavelength conversion element.

In FIG. 18, there are two harmonics; the harmonic 121 generated by the fundamental wave propagating from left to right and the harmonic 122 generated by the fundamental wave propagating from right to left. In order to effectively utilize generated harmonics, the reflecting mirror 116 is generally a coat for highly reflecting harmonics. However, in this case, the harmonic 122 is incident again on the wavelength conversion element 118 after being reflected by the reflecting mirror 116. At this time, the harmonic is partly reversely converted into a fundamental wave. The phase of the reversely converted fundamental wave slightly deviates from that of the original fundamental wave in some cases, whereby the reversely converted fundamental wave and the original fundamental wave interfere to vary a fundamental wave output. As a result, a harmonic output becomes unstable as shown in FIG. 20.

FIG. 20 is a graph showing destabilization of a harmonic output caused by reverse conversion of a harmonic into a fundamental wave in an optical resonator. As shown in FIG. 20, as the amount of a pump beam increases, the harmonic output increases and, after temporarily decreasing, increases again. Since the harmonic is reversely converted into the fundamental wave in the optical resonator in this way, the reversely converted fundamental wave and the original fundamental wave interfere to make the harmonic output unstable.

A construction for absorbing one harmonic is proposed in patent literature 1 in connection with the above problem. Further, a construction as shown in FIG. 21 is used in patent literature 2. FIG. 21 is a diagram showing the construction of a conventional solid-state laser device realizing harmonic output stability.

A pump beam 302 emitted from a semiconductor laser light source 301 is obliquely incident on a solid laser crystal 303. A fundamental wave 306 is generated in an optical resonator formed by two reflecting minors 304, 307 and a part of the fundamental wave 306 is converted into a harmonic in a wavelength conversion element 305. A harmonic 308 generated from the fundamental wave propagating from left to right in FIG. 21 is output after passing through the reflecting mirror 307. The reflecting minor 307 exhibits a low reflection for harmonic.

On the other hand, a harmonic 309 generated from the fundamental wave propagating from right to left in FIG. 21 is output after passing through the reflecting minor 304. The reflecting mirror 304 also exhibits a low reflection for harmonic. By the above construction, the two harmonics are extracted in different directions to prevent a bad influence on the fundamental waves.

However, since one harmonic is absorbed in the example of patent literature 1, the harmonic output becomes about half, wherefore efficiency is poor and it is difficult to obtain a high output. Further, in the example of patent literature 2, the harmonics are extracted in right opposite directions. Thus, the direction of either one of the beams needs to be changed if it is tried to use both of the two output harmonics, which leads to an increase in optical parts and a cost increase.
[Patent Literature 1]
Publication of Japanese Patent No. 3222288
[Patent Literature 2]
Japanese Unexamined Patent Publication No. 2006-186071

SUMMARY OF THE INVENTION

In order to solve the above problems, an object of the present invention is to provide a solid-state laser device and an image display device capable of stabilizing a harmonic output and using a plurality of harmonics without increasing the number of parts.

One aspect of the present invention is directed to a solid-state laser device, comprising a semiconductor laser light source for emitting a laser beam for pumping; an optical resonator including a solid laser crystal to be excited by the incidence of a laser beam to oscillate a fundamental wave and a pair of mirrors arranged at the opposite sides of the solid laser crystal; and a wavelength conversion element for converting the fundamental wave into harmonics, wherein the wavelength conversion element is so arranged in the optical resonator that the optical axis of at least one of a plurality of harmonics generated in the optical resonator is made different from that of the fundamental wave and the at least one harmonic whose optical axis is made different is output substantially in the same direction as the other harmonic.

According to this construction, the semiconductor laser light source emits a laser beam for pumping. The optical resonator includes the solid laser crystal to be excited by the incidence of a laser beam to oscillate a fundamental wave and the pair of mirrors arranged at the opposite sides of the solid laser crystal. The wavelength conversion element converts the fundamental wave into harmonics. The wavelength conversion element is so arranged in the optical resonator that the optical axis of the at least one of the plurality of harmonics generated in the optical resonator is made different from that of the fundamental wave and the at least one harmonic whose optical axis is made different is output substantially in the same direction as the other harmonic.

According to the present invention, since the optical axis of the at least one of the plurality of harmonics generated in the optical resonator and that of the fundamental wave are different, it is possible to prevent the interference of a fundamental wave reversely converted from the harmonic and the initial fundamental wave and stabilize a harmonic output. Further, since the at least one harmonic is output substantially in the same direction as the other harmonic, a plurality of harmonics can be utilized without increasing the number of parts.

Objects, features and advantages of the present invention will become more apparent upon reading the following detailed description along with the accompanying drawings.

DETAILED DESCRIPTION OF THE INVENTION

Figure 1:
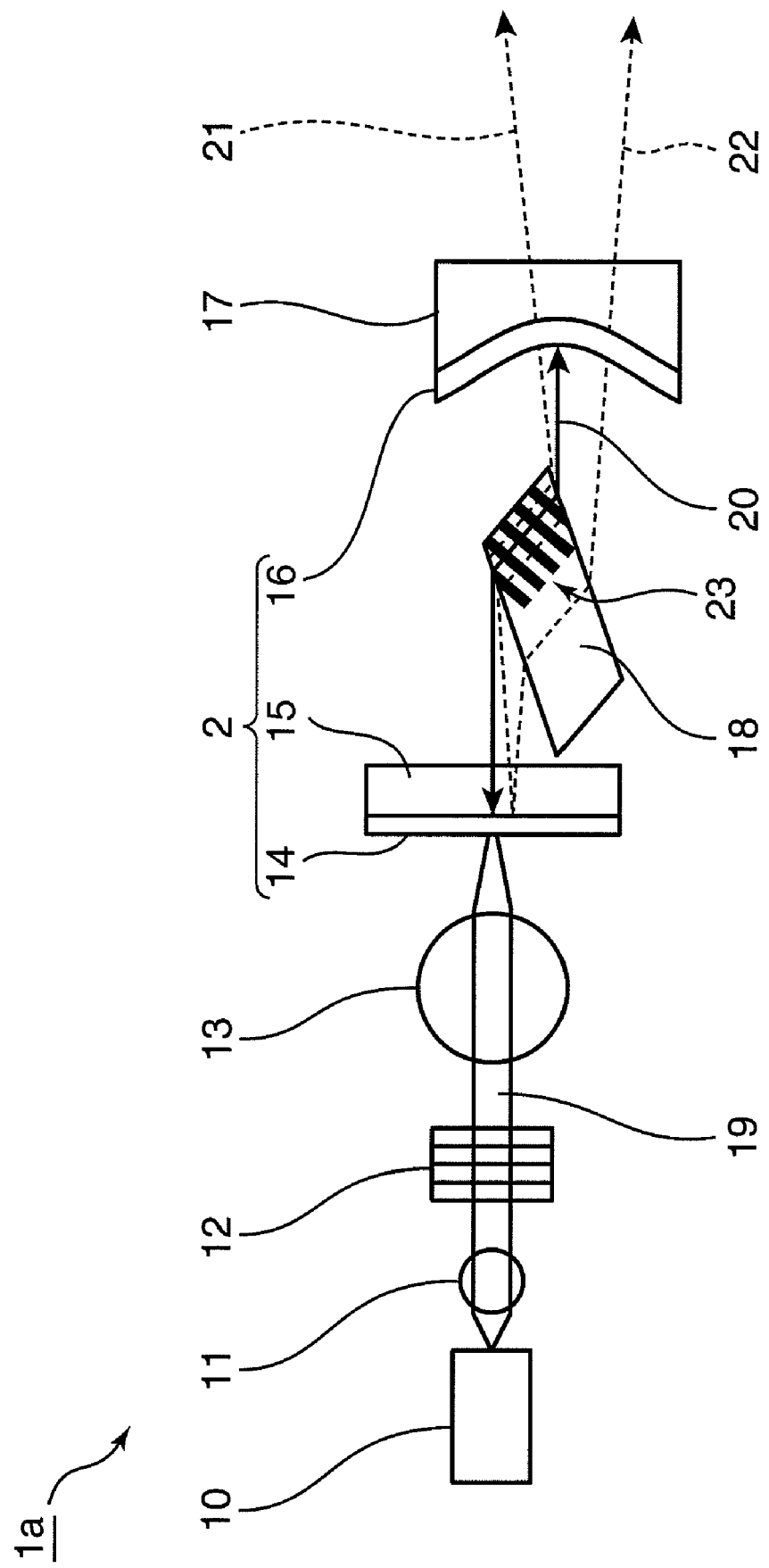
FIG. 1 is a diagram showing the construction of a solid-state laser device according to a first embodiment of the invention.

Hereinafter, embodiments of the present invention are described with reference to the drawings. The same elements are identified by the same reference numerals and not described. The following embodiments are specific examples of the present invention and not of the nature to limit the technical scope of the present invention.

First Embodiment

FIG. 1 is a diagram showing the construction of an internal resonator type solid-state laser device 1a according to a first embodiment of the present invention. The solid-state laser device 1a of the first embodiment is provided with a semiconductor laser light source 10, a rod lens 11, a volume Bragg grating (hereinafter, referred to as VBG) 12, a ball lens 13, an optical resonator 2, a concave mirror 17 and a wavelength conversion element 18.

The semiconductor laser light source 10 emits a laser beam for pumping (hereinafter, referred to as pump beam) 19. The optical resonator 2 is comprised of a solid laser crystal 15 to be excited by the incidence of the pump beam 19 to oscillate a fundamental wave 20 and a pair of fundamental wave reflective coats 14, 16 arranged at the opposite sides of the solid laser crystal 15. The wavelength conversion element 18 is arranged in the optical resonator 2 for converting the fundamental wave 20 into a plurality of harmonics 21, 22.

In the solid-state laser device 1a of the first embodiment, the pump beam 19 is emitted from the semiconductor laser light source 10 to be incident on the solid laser crystal 15 via the rod lens 11, a volume Bragg grating 12 and the ball lens 13.

If a composite solid laser crystal formed by bonding solid laser crystals with different Nd concentrations is used as the solid laser crystal 15, a temperature increase in the solid laser crystal can be suppressed, wherefore it is easier to obtain a high output. In this case, if the Nd concentration at a pump beam incident side is set low, the pump beam is gradually absorbed in the solid laser crystal, wherefore a temperature increase can be suppressed. In the first embodiment, a $YVO_4$ crystal doped with Nd is used as the solid laser crystal 15. The solid laser crystal 15 may be made of $Nd:GdVO_4$, Nd:YAG, Yb:YAG, Er:YAG or the like.

The pump beam 19 having a wavelength of about 808 nm and emitted from the semiconductor laser light source 10 is incident on the VBG 12 after having its vertical-direction component collimated by the rod lens 11. The pump beam 19 incident on the VBG 12 has a part thereof reflected and fed back to the semiconductor laser light source 10. In this way, an oscillation wavelength of the semiconductor laser light source 10 is locked at a wavelength (808 nm) selected by the VBG 12. Here, the reason for selecting the oscillation wavelength of 808 nm is that $Nd:YVO_4$ efficiently absorbs a laser beam. In the case of using a solid laser crystal made of a different material, an oscillation wavelength may be set at the one suitable for this solid laser crystal without being limited to 808 nm.

By using the VBG 12 in this way, the oscillation wavelength of the semiconductor laser light source 10 can be substantially constantly maintained even if temperature changes, wherefore the need for a highly accurate temperature control of the semiconductor laser light source 10 can be made unnecessary. Since this obviates the need for a highly accurate temperature adjusting device such as a Peltier element, cost reduction, power saving and miniaturization of the device become easier.

Although the VBG 12 is used to lock the oscillation wavelength of the semiconductor laser light source 10 in the first embodiment, a band-pass filter formed by a dielectric multilayer coat may be used. Alternatively, the semiconductor laser light source 10 may have a function of locking the oscillation wavelength of the pump beam 19. In other words, the semiconductor laser light source 10 itself may be a DFB (Distributed FeedBack) laser or a DBR (Distributed Bragg Reflector) laser having a wavelength locking function. This also holds true for the following embodiments.

The pump beam 19 having the wavelength locked by the VBG 12 is condensed on the solid laser crystal 15 by the ball lens 13. The optical system can be easily miniaturized by using the ball lens 13. Further, since the ball lens 13 is easier to produce as compared with an aspherical lens or the like, cost can be reduced. The solid laser crystal 15 is excited by the pump beam 19 condensed by the ball lens 13 to generate the fundamental wave 20 having a wavelength of 1064 nm.

The fundamental wave 20 resonates in the optical resonator 2 formed by the fundamental wave reflective coat 14 and the fundamental wave reflective coat 16 formed on the concave mirrors 17, the reflective coats 14, 16 being arranged at the opposite sides of the solid laser crystal 15. The fundamental wave reflective coats 14, 16 are respectively formed on the outer surfaces of the solid laser crystal 15 and the concave mirror 17. The fundamental wave reflective coats 14, 16 are formed by dielectric multilayer coats. By the quasi-phase-matching wavelength conversion element 18 arranged in the optical resonator 2, a part of the fundamental wave 20 is wavelength converted and a green beam having a wavelength of 532 nm as a second harmonic laser beam is output to the outside.

In the first embodiment, a quasi-phase-matching wavelength conversion element having polarization reversal regions 23 periodically formed on a $LiNbO_3$ substrate doped with Mg is used as the wavelength conversion element 18. The $LiNbO_3$ substrate doped with Mg has a large nonlinear constant and enables the thickness of the wavelength conversion element to be reduced. Since this widens a temperature range in which a wavelength conversion is possible, a drive temperature range of the solid-state laser device can be widened.

Figure 2:
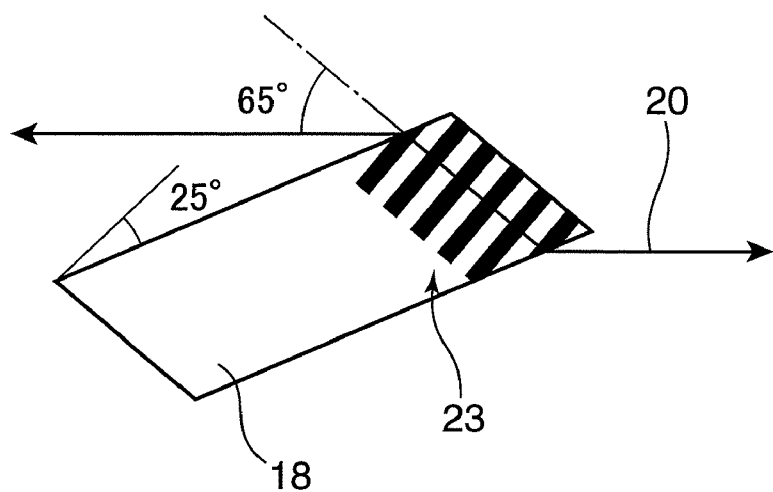
FIG. 2 is an enlarged view of a wavelength conversion element of FIG. 1.

FIG. 2 is an enlarged view of the wavelength conversion element of FIG. 1. The wavelength conversion element 18 is ground into a parallelogram and inserted at a Brewster angle in the optical resonator 2. The wavelength conversion element 18 is formed by obliquely grinding light incident and emergent surfaces of a rectangular parallelepipedic wavelength conversion element in such a manner as to have a parallelogram cross section. The Brewster angle is 65° with respect to a fundamental wave incident surface of the wavelength conversion element 18. A grinding angle of the wavelength conversion element 18 is 25°.

The wavelength conversion element 18 is ground at 25° for the following reason. The wavelength conversion element 18 is formed with the periodical polarization reversal regions 23 for highly efficient wavelength conversion. However, the polarization reversal regions 23 cannot be so deep as to penetrate the wavelength conversion element. If the polarization reversal regions 23 are made deeper, a periodical structure becomes more easily disturbed, which leads to a reduction in conversion efficiency. Thus, the depth of the polarization reversal regions 23 is preferably about half the thickness of the wavelength conversion element. Specifically, the depth of the polarization reversal regions 23 is 200 μm to 500 μm. If the grinding angle is set at about 25°, the fundamental wave 20 passes substantially perpendicularly to the polarization reversal regions 23 as shown in FIG. 2. Thus, the polarization reversal regions 23 need not be so deep. Therefore, highly efficient wavelength conversion is realized.

In order to obtain the above effect, the grinding angle of the wavelength conversion element 18 may be in a range of 25±5°. By inserting the wavelength conversion element 18 at the Brewster angle into the optical resonator 2, a reflection loss at the time of incidence on the wavelength conversion element 18 is reduced. If an optical loss in the optical resonator 2 increases, the amount of the fundamental wave in the optical resonator 2 decreases, wherefore a problem of reducing the obtained harmonic output occurs.

However, since reflection losses on the incident and emergent surfaces of the wavelength conversion element 18 become substantially zero if the wavelength conversion element 18 is inserted at the Brewster angle, a reduction in the amount of the fundamental wave can be substantially eliminated and a light quantity loss in the optical resonator can be reduced. In other words, since a reduction in the harmonic output can be prevented, a reduction in the emission efficiency of the solid-state laser device 1a can be prevented. Even if anti-reflection coating for fundamental wave is applied to the wavelength conversion element 18, a reflection loss slightly remains. In addition, the stabilization of the harmonic output can be realized by obliquely grinding the opposite surfaces of the wavelength conversion element 18 and inserting this wavelength conversion element 18 into the optical resonator 2.

Since the wavelength conversion element 18 is ground at the angle of 25±5°, the depth of the polarization reversal regions 23 can be reduced and the polarization reversal regions 23 can be easily formed.

As shown in FIG. 1, the fundamental wave propagates both to right and to left in the optical resonator 2. On the other hand, two harmonics are generated. The harmonic 21 is generated by the fundamental wave 20 propagating from left to right in FIG. 1. Since the harmonic 21 has a shorter wavelength than the fundamental wave 20, it has a large refractive index in the wavelength conversion element 18 and emerges at an angle different from the fundamental wave 20. The harmonic 22 is generated by the fundamental wave 20 propagating from right to left in FIG. 1. The harmonic 22 passes through the solid laser crystal 15 and is reflected by the fundamental wave reflective coat 14 after emerging from the wavelength conversion element 18. The fundamental wave reflective coat 14 is so designed to highly reflect harmonics. The harmonic 22 reflected by the fundamental wave reflective coat 14 passes through the wavelength conversion element 18 and is output from the concave mirror 17 after being incident again on the wavelength conversion element 18.

Since the harmonics 21, 22 propagate along different optical paths, they do not interfere with each other. Since the harmonic 22 incident again on the wavelength conversion element 18 propagates along the optical path different from the fundamental wave 20, there is no influence on the fundamental wave 20 even if the harmonic should be reversely converted into the fundamental wave. Thus, the fundamental wave and harmonic outputs hardly vary. If the construction of FIG. 1 is employed, the propagation directions of the generated two harmonics 21, 22 are substantially same, wherefore the output two harmonics 21, 22 can be easily utilized.

As described above, the semiconductor laser light source 10 emits a laser beam for pumping. The optical resonator 2 includes the solid laser crystal 15 to be excited by the incidence of a laser beam to oscillate the fundamental wave and the pair of fundamental wave reflective coats 14, 16 arranged at the opposite sides of the solid laser crystal 15. The wavelength conversion element 18 converts the fundamental wave 20 into a plurality of harmonics 21, 22. The wavelength conversion element 18 is so arranged in the optical resonator 2 that the optical axis of at least one 22 of the plurality of harmonics 21, 22 generated in the optical resonator 2 is made different from that of the fundamental wave 20 and the at least one harmonic 22 whose optical axis is made different is output substantially in the same direction as the other harmonic 21.

Accordingly, the optical axis of at least one 22 of the plurality of harmonics 21, 22 generated in the optical resonator 2 differs from that of the fundamental wave 20. Thus, it is possible to prevent the interference of the fundamental wave reversely converted from the harmonic and the original harmonic and stabilize the harmonic output. Since the at least one harmonic 22 is output substantially in the same direction as the other harmonic 21, the plurality of harmonics can be utilized without increasing the number of parts.

Although the quasi-phase-matching wavelength conversion element in which the periodical polarization reversal regions are formed on the $LiNbO_3$ substrate doped with Mg is used as the wavelength conversion element 18 in the first embodiment, it is obvious that the use of a substrate made of a base material such as $LiTaO_3$, $KTiOPO_4$ (KTP), $LiB_3O_5$ (LBO) or $BaB_2O_4$ (BBO) is also effective. Further, although a green beam is output by wavelength conversion in the first embodiment, it is obvious that the output of a beam of another color using the solid-state laser device of the first embodiment is also effective. These also hold true for the following embodiments.

Although the pump beam 19 is caused to be incident on the solid laser crystal 15 by the optical system using the ball lens 13 in the first embodiment, the pump beam 19 may be guided to the solid laser crystal 15 using another lens such as an aspherical lens or a cylindrical lens. This also holds true for the following embodiments.

In the first embodiment, the $YVO_4$ crystal doped with 1 to 3% of Nd is used as the solid laser crystal 15. If the concentration of Nd is below 1%, an absorption length of the pump beam becomes longer and, hence, the solid laser crystal 15 is enlarged. On the other hand, if the concentration of Nd is equal to or above 3%, the structure of the solid laser crystal 15 becomes unstable. Thus, the concentration of Nd is preferably 1 to 3%. This also holds true for the following embodiments.

As described above, according to the first embodiment, the stabilization of the harmonic output is realized and generated harmonics propagate substantially in the same direction. Thus, the solid-state laser device 1a of the first embodiment can be utilized as a light source whose output can be easily stabilized, for example, in the case of being used in a display device. Further, there are no increase in the number of parts and no output loss accompanying output stabilization.

Second Embodiment

In a second embodiment is described an example in which a wavelength conversion element formed with a plurality of polarization reversal regions with different periods is used by being inserted into an optical resonator. The wavelength conversion element used in the second embodiment is obliquely ground and inserted at a Brewster angle into the optical resonator similar to the first embodiment.

Figure 3:
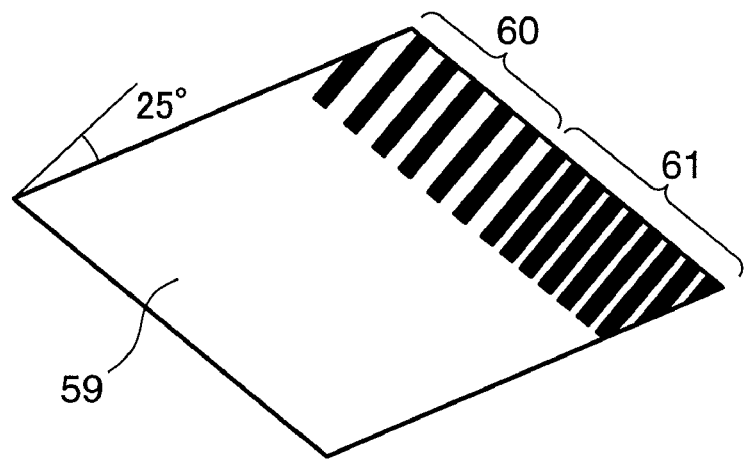
FIG. 3 is a diagram showing the construction of a wavelength conversion element used in a solid-state laser device according to a second embodiment of the invention.

FIG. 3 is a diagram showing the construction of a wavelength conversion element 59 used in a solid-state laser device according to the second embodiment of the present invention. In the second embodiment, the construction other than the wavelength conversion element 59 is the same as the solid-state laser device of the first embodiment. As shown in FIG. 3, the wavelength conversion element 59 is formed with a first polarization reversal region 60 and a second polarization reversal region 61 with a period different from that of the first polarization reversal region 60.

Figure 4:
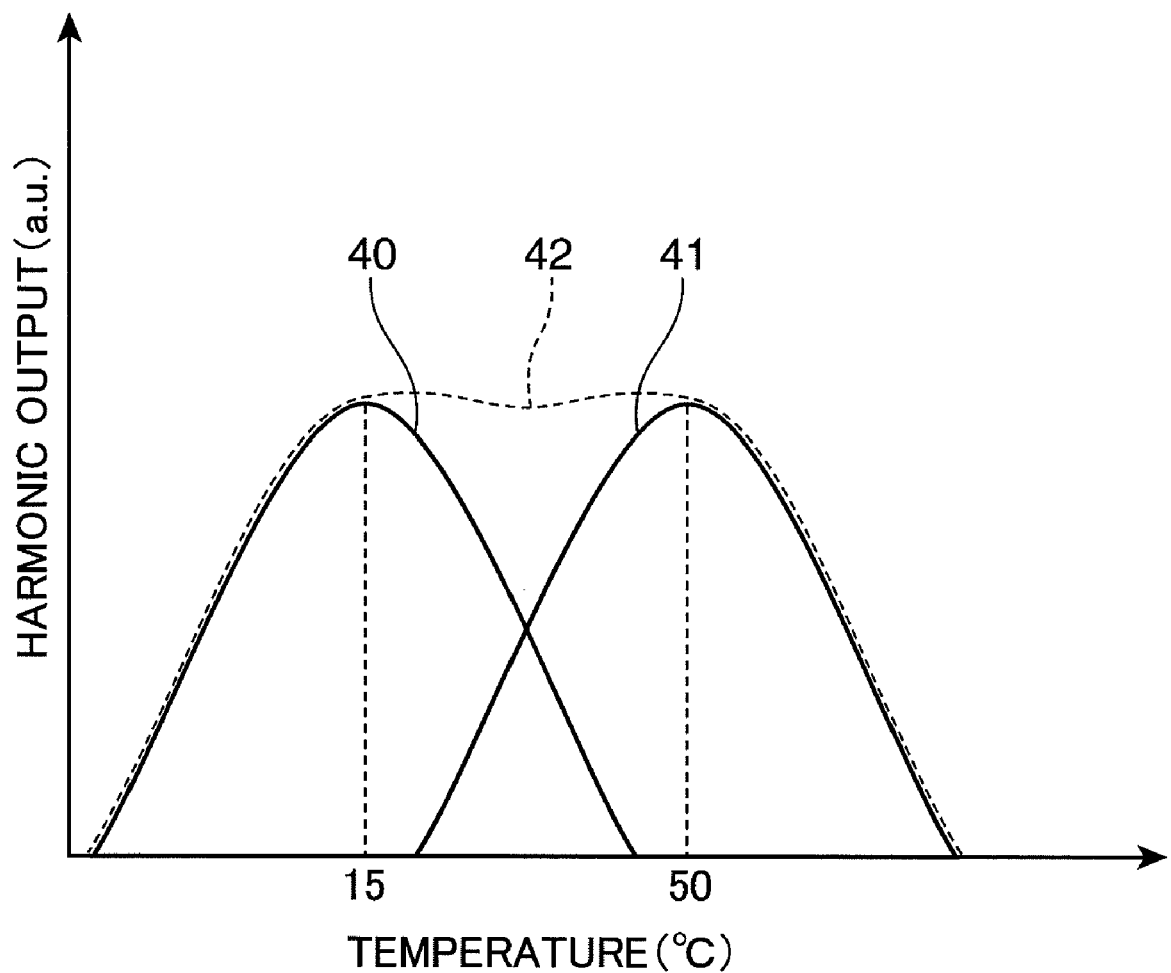
FIG. 4 is a graph showing temperature characteristics of a wavelength conversion element including a plurality of polarization reversal regions with different periods.

FIG. 4 is a graph showing temperature characteristics of the wavelength conversion element including the plurality of polarization reversal regions with different periods. In FIG. 4, a horizontal axis represents temperature and a vertical axis represents harmonic output. A temperature characteristic 40 of a harmonic output in the first polarization reversal region 60 and a temperature characteristic 41 of a harmonic output in the second polarization reversal region 61 are as shown in FIG. 4. The first and second polarization reversal regions 60, 61 are respectively formed to maximize their conversion efficiencies at different temperatures.

In the second embodiment, the first polarization reversal region 60 is so designed as to maximize its conversion efficiency at 15° C. and the second polarization reversal region 61 is so designed as to maximize its conversion efficiency at 50° C. A temperature characteristic 42 as the sum of the temperature characteristic 40 of the harmonic output in the first polarization reversal region 60 and the temperature characteristic 41 of the harmonic output in the second polarization reversal region 61 can reduce an output variation in a wide temperature range. If the wavelength conversion element 59 of the second embodiment is used, the output variation is suppressed in a light source temperature range from 15° C. to 50° C., wherefore a control for output stabilization can be easily executed.

Since the wavelength conversion element 59 is formed with the plurality of polarization reversal regions (first polarization reversal region 60 and second polarization reversal region 61) with different periods as described above, a usable temperature range can be enlarged.

By being inserted into the optical resonator 2, the wavelength conversion element 59 including the plurality of polarization reversal regions with different periods and used in the second embodiment has better effects as compared with the case of a wavelength conversion by another method such as a one-pass method or a waveguide method. In other words, in the one-pass method or waveguide method for wavelength conversion by causing the fundamental wave 20 to pass once without using the optical resonator 2, the length of the wavelength conversion element in an optical axis direction needs to be increased since an active length necessary for wavelength conversion is long. In the case of increasing the length of the wavelength conversion element in the optical axis direction, it is required to uniformly form a periodical polarization reversal region in the entire fundamental wave transmission region. Thus, a yield of wavelength conversion elements is likely to decrease. Further, it also leads to a cost increase and the enlargement of the solid-state laser device to make the wavelength conversion element longer.

On the other hand, fundamental wave power in the optical resonator 2 is considerably large in the case of inserting the wavelength conversion element 59 into an internal resonator as in the second embodiment. Thus, the length of the wavelength conversion element may be short and a likelihood of forming the polarization reversal region becomes larger. Specifically, a wavelength conversion element of several tens of mm is necessary in the one-path method, whereas the length of the wavelength conversion element may be about 1.5 to 2.5 mm in the case of inserting the wavelength conversion element into the optical resonator. Thus, ten times as many or more samples can be obtained from the same wafer and cost can be reduced.

Further, in the case of forming a plurality of polarization reversal regions with different periods as in the second embodiment, conversion efficiency can be increased as compared with the case where a temperature width is enlarged in a polarization reversal region with a single period. In the case of enlarging a temperature width in a polarization reversal region with a single period, conversion efficiency decreases since the length of the wavelength conversion element needs to be shortened. Since an improvement in the conversion efficiency leads to an improvement in the electrical/optical conversion efficiency of the solid-state laser device, the amount of generated heat is reduced, a device including the solid-state laser device can easily radiate heat and the volume of a part necessary for heat radiation can be made smaller.

Although the two polarization reversal regions with different periods are used in the second embodiment, effects similar to the above can also be obtained when there are three or more polarization reversal regions with different periods or the period of a polarization reversal region is continuously changed.

As described above, since an output variation can be suppressed in a wide temperature range in the second embodiment, a harmonic output can be stabilized even without executing a highly accurate temperature control using a Peltier element or the like, which is effective in reducing cost and power consumption.

Third Embodiment

In a third embodiment is described an example in which a plurality of obliquely ground wavelength conversion elements are inserted at a Brewster angle into an optical resonator.

Figure 5:
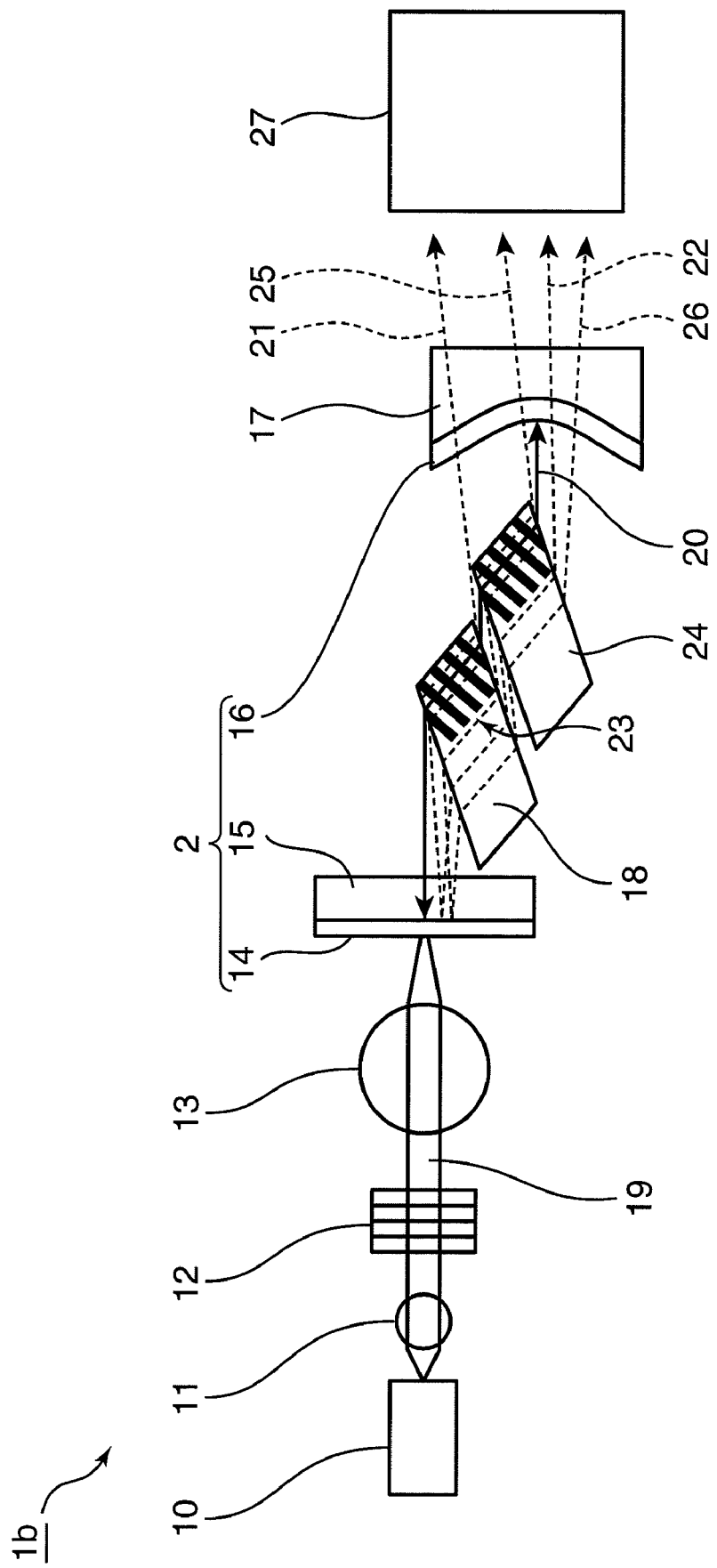
FIG. 5 is a diagram showing the construction of a solid-state laser device according to a third embodiment of the invention.

FIG. 5 is a diagram showing the construction of a solid-state laser device according to the third embodiment of the present invention. A solid-state laser device 1b shown in FIG. 5 is provided with a semiconductor laser light source 10, a rod lens 11, a VBG 12, a ball lens 13, an optical resonator 2, a concave mirror 17 and wavelength conversion elements 18, 24. A basic construction of the solid-state laser device 1b of the third embodiment is similar to that of the solid-state laser device 1a of the first embodiment, but the wavelength conversion element 24 is inserted in the optical resonator 2.

As shown in FIG. 5, the number of harmonics to be output increases by adding the wavelength conversion element 24 between the wavelength conversion element 18 and a fundamental wave reflective coat 16. In other words, four harmonics 21, 22, 25 and 26 are output from the solid-state laser device 1b. As the number of harmonics increases, light intensity can be more easily uniformized in a uniformizing optical system 27. The uniformizing optical system 27 includes a rod integrator, a fly-eye lens or a lenticular lens. In addition, in the case of using this solid-state laser device in a backlight of a liquid crystal display, a plurality of harmonic beams are output from the solid-state laser device 1b, wherefore light is more easily uniformized in a light guide plate.

By making a polarization reversal period different between the wavelength conversion elements 18 and 24, an output variation can be suppressed in a wider temperature range. This point is described with reference to FIG. 6.

Figure 6:
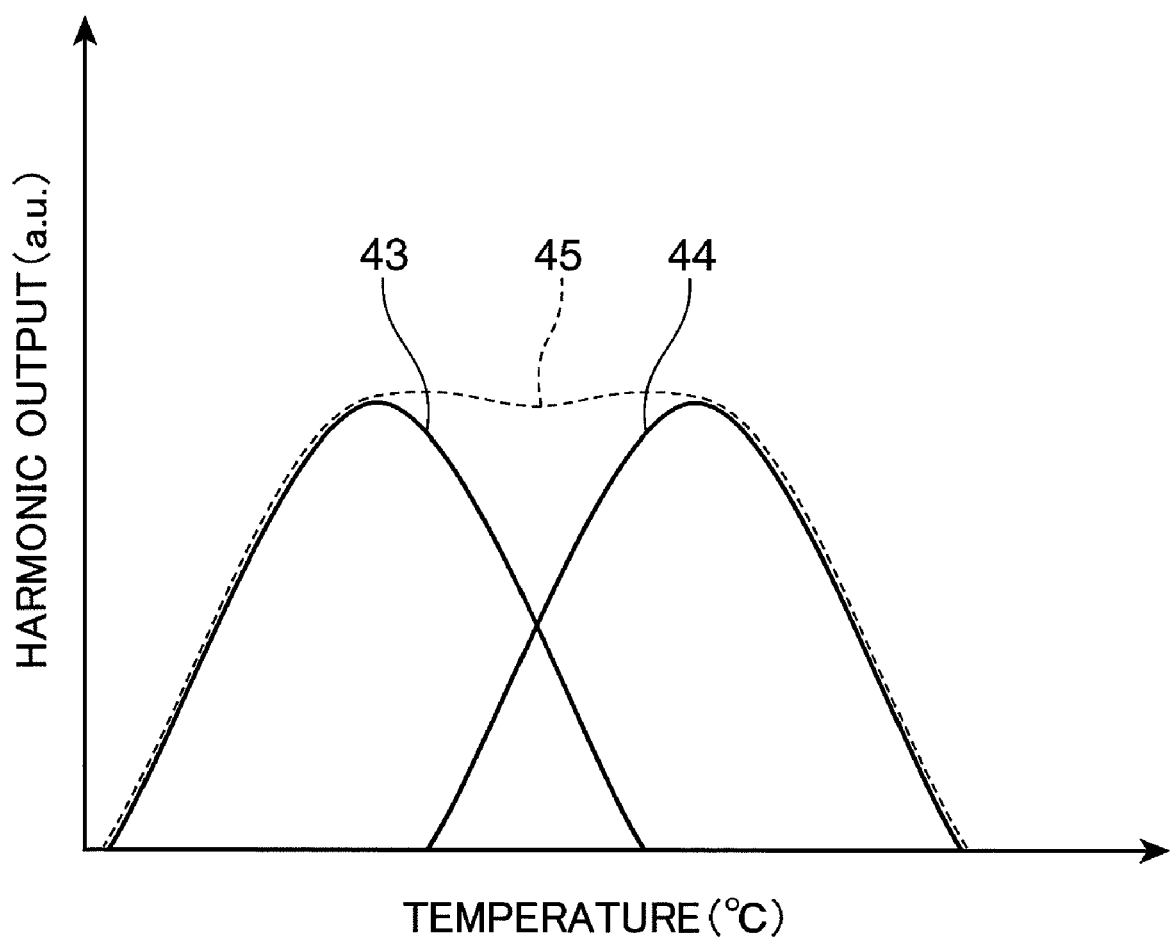
FIG. 6 is a graph showing temperature characteristics of a plurality of wavelength conversion elements with different polarization reversal periods.

FIG. 6 is a graph showing temperature characteristics of a plurality of wavelength conversion elements with different polarization reversal periods. In FIG. 6, a horizontal axis represents temperature and a vertical axis represents harmonic output. Solid lines in FIG. 6 indicate a temperature characteristic 43 of a harmonic output in the wavelength conversion element 18 and a temperature characteristic 44 of a harmonic output in the wavelength conversion element 24. The wavelength conversion elements 18, 24 are respectively formed to maximize their conversion efficiencies at different temperatures.

If the polarization reversal periods are different, temperature ranges covered by the respective wavelength conversion elements 18, 24 differ. Although the temperature ranges covered by the respective wavelength conversion elements 18, 24 are limited, a temperature characteristic 45 of the total harmonic output is as shown by dotted line in FIG. 6 by inserting the two wavelength conversion elements 18, 24 with different polarization reversal periods in the optical resonator 2, and a harmonic output variation upon a temperature change becomes smaller in a wide temperature range.

As described above, according to the third embodiment, the polarization reversal periods of a plurality of wavelength conversion elements 18, 24 respectively differ, wherefore a usable temperature range can be enlarged while the stabilization of the harmonic output is realized. Since the plurality of wavelength conversion elements 18, 24 are inserted in the optical resonator 2, the number of harmonic beams to be output increases and the light quantity of output beams can be easily uniformized. As a result, this solid-state laser device 1b can be used in a backlight of a liquid crystal display.

Fourth Embodiment

In this fourth embodiment is described an example in which a wavelength conversion element formed with a harmonic reflective coat is obliquely inserted in an optical resonator to output a plurality of harmonics and realize the stabilization of a harmonic output.

Figure 7:
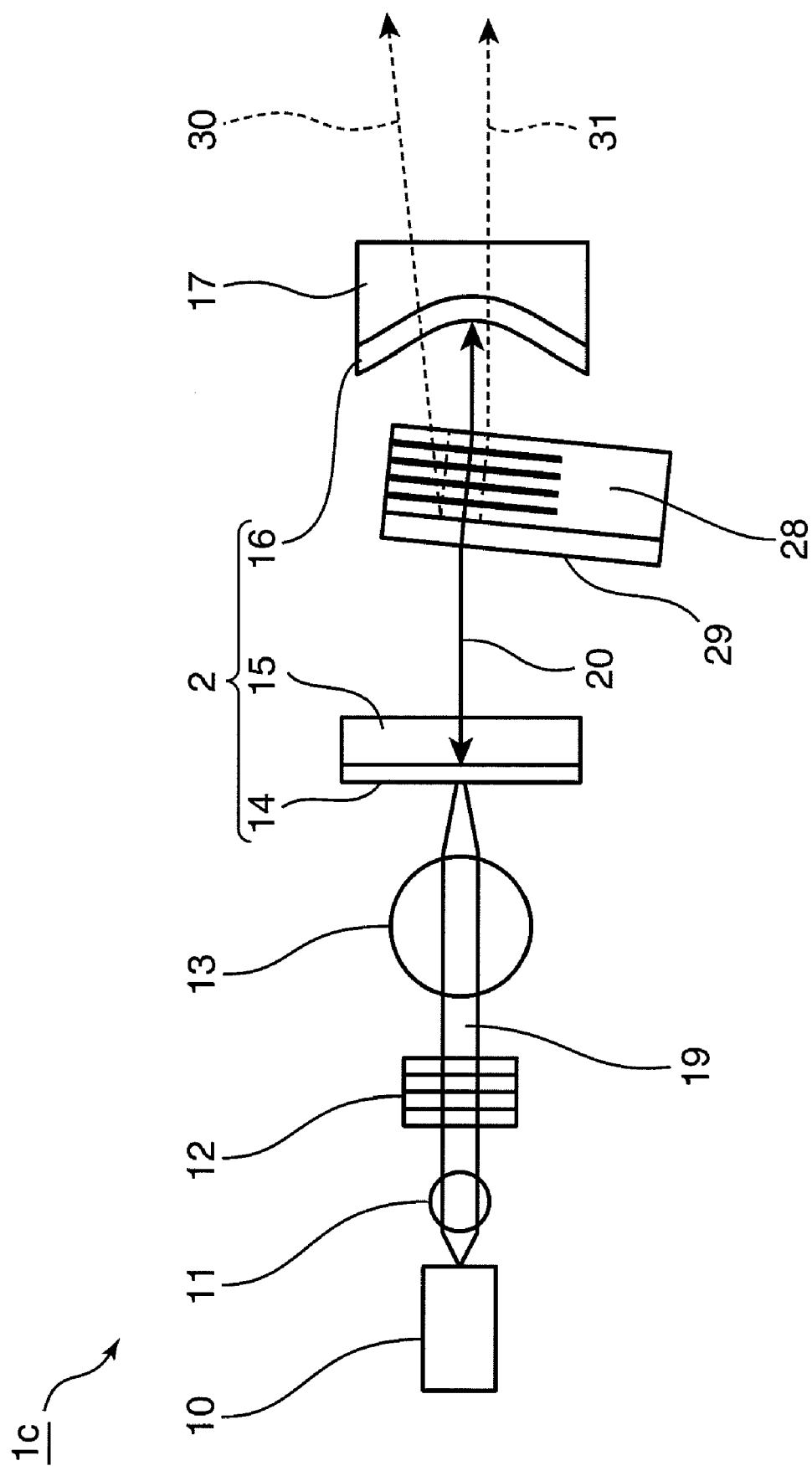
FIG. 7 is a diagram showing the construction of a solid-state laser device according to a fourth embodiment of the invention.

FIG. 7 is a diagram showing the construction of a solid-state laser device according to the fourth embodiment of the present invention. A solid-state laser device 1c shown in FIG. 7 is provided with a semiconductor laser light source 10, a rod lens 11, a VBG 12, a ball lens 13, an optical resonator 2, a concave mirror 17 and a wavelength conversion element 28. A basic construction of the solid-state laser device 1c of the fourth embodiment is similar to that of the solid-state laser device 1a of the first embodiment, but differs in the structure of the wavelength conversion element 28 inserted in the optical resonator 2. The wavelength conversion element 28 is formed with a polarization reversal region in parallel with a light incident surface.

As shown in FIG. 7, a harmonic reflective coat 29 is added to one end surface of the wavelength conversion element 28. In the fourth embodiment, the harmonic reflective coat 29 is arranged on the incident surface of the wavelength conversion element 28 for reflecting a harmonic. The harmonic reflective coat 29 is so designed as not to reflect a fundamental wave. The wavelength conversion element 28 is obliquely inserted at a specified angle in the optical resonator 2.

Specifically, the light incident surface of the wavelength conversion element 28 is inclined at the specified angle with respect to a plane perpendicular to an optical axis of the fundamental wave. An angle of inclination of the light incident surface of the wavelength conversion element 28 with respect to the plane perpendicular to the optical axis of the fundamental wave is about 0.5° to 10°. If the angle of inclination is smaller than 0.5°, a generated harmonic is more likely to be reversely converted into a fundamental wave and fundamental wave and harmonic outputs are more likely to decrease. On the other hand, if the angle of inclination is larger than 10°, a reduction in the harmonic output increases due to a reduction in the wavelength conversion efficiency of the wavelength conversion element.

Accordingly, if the angle of inclination of the light incident surface of the wavelength conversion element 28 with respect to the plane vertical to the optical axis of the fundamental wave 20 lies in the range of 0.5° to 10°, the harmonic output can be stabilized without being reduced.

As shown in FIG. 7, by obliquely inserting the wavelength conversion element formed with the harmonic reflective coat 29 on either one of the incident and emergent surfaces into the optical resonator 2, a harmonic 31 generated by the fundamental wave 20 propagating from left to right in FIG. 7 and a harmonic 30 generated by the fundamental wave 20 propagating from right to left in FIG. 7 pass along different optical paths, wherefore influence on the output variation is reduced. In other words, the harmonic 30 is generated by the fundamental wave 20 propagating from right to left in FIG. 7, but is reflected by the harmonic reflective coat 29. Hence, the harmonic 30 propagates along an optical path different from the fundamental wave 20.

As described above, the harmonic reflective coat 29 for reflecting the harmonic is formed on either one of the incident and emergent surfaces of the wavelength conversion element 28 and the wavelength conversion element 28 is arranged at the specified angle with respect to the optical axis of the fundamental wave 20.

Accordingly, the optical axis of the harmonic 30 reflected by the harmonic reflective coat 29 and that of the fundamental wave 20 differ, wherefore the interference of the fundamental wave reversely converted from the harmonic and the initial fundamental wave can be prevented and the harmonic output can be stabilized.

As described above, according to the fourth embodiment, propagation directions of the harmonics can be changed by a very simple construction without increasing the number of parts. Further, since the propagation directions of the generated two harmonics 30, 31 are substantially same, the output harmonics can be easily utilized and, in addition, stable harmonics can be output with high efficiency.

Fifth Embodiment

In this fifth embodiment is described an example in which a quasi-phase-matching wavelength conversion element is so ground (hereinafter, also wedged) that one surface is not parallel to the other surface, thereby realizing the stabilization of a harmonic output.

Figure 8:
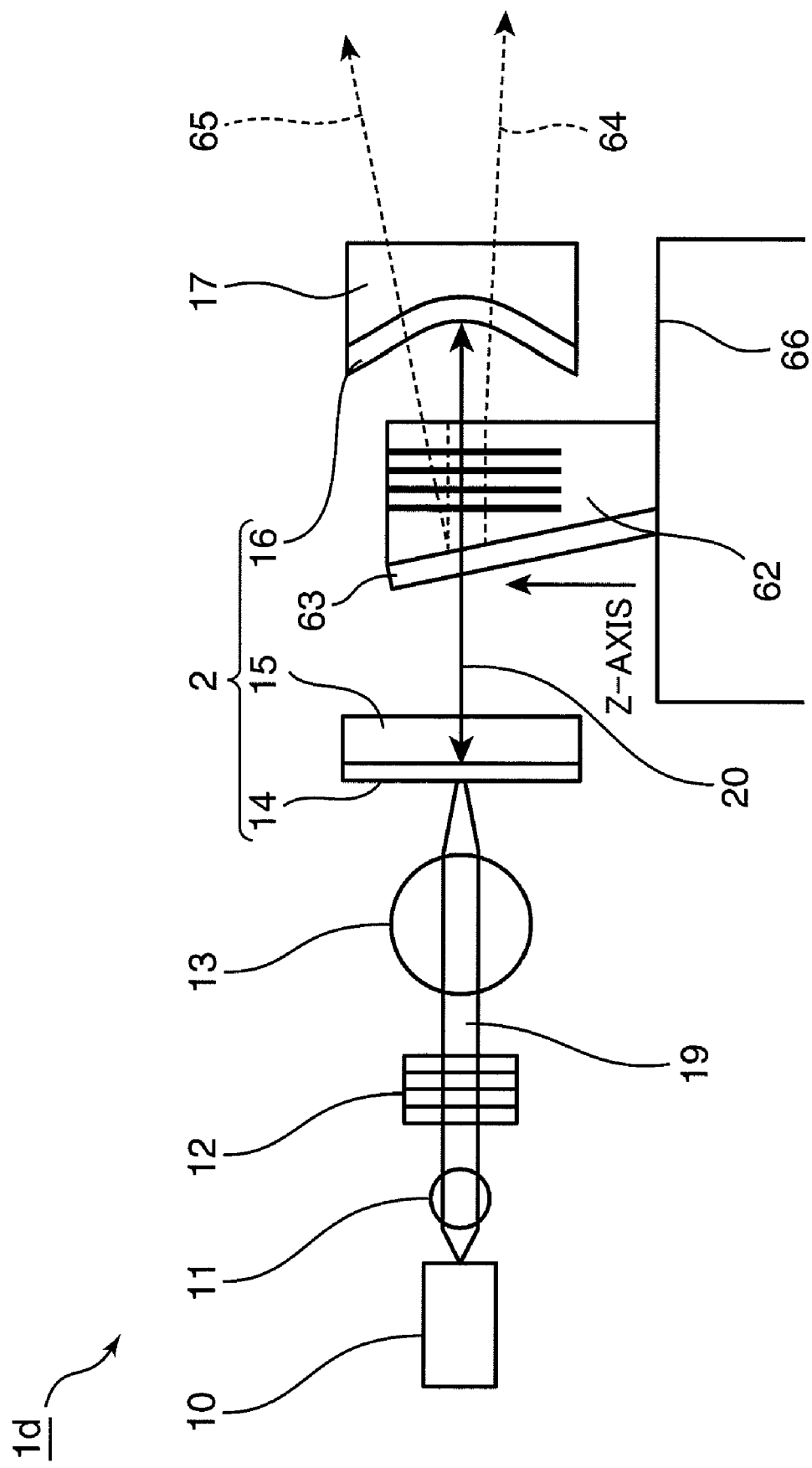
FIG. 8 is a diagram showing the construction of a solid-state laser device according to a fifth embodiment of the invention.

FIG. 8 is a diagram showing the construction of a solid-state laser device according to the fifth embodiment of the present invention. A solid-state laser device 1d shown in FIG. 8 is provided with a semiconductor laser light source 10, a rod lens 11, a VBG 12, a ball lens 13, an optical resonator 2, a concave mirror 17 and a wavelength conversion element 62. A basic construction of the solid-state laser device 1d of the fifth embodiment is similar to that of the solid-state laser device 1a of the first embodiment, but differs in the structure of the wavelength conversion element 62 inserted in the optical resonator 2.

As shown in FIG. 8, a harmonic reflective coat 63 is added on one end surface of the wavelength conversion element 62, and this end surface is obliquely ground. In the fifth embodiment, the harmonic reflective coat 63 is arranged on an incident surface of the wavelength conversion element 62 for reflecting a harmonic. The incident surface of the wavelength conversion element 62 is obliquely ground at a specified angle. The harmonic reflective coat 63 is so designed as not to reflect a fundamental wave. The wavelength conversion element 62 is formed with a polarization reversal region in parallel with a light emergent surface.

By wedging the incident surface of the wavelength conversion element 62 as shown in FIG. 8, a harmonic 65 generated by a fundamental wave 20 propagating from right to left in FIG. 8 is reflected by the harmonic reflective coat 63 formed on the obliquely ground incident surface. Thus, the harmonic 65 reflected by the harmonic reflective coat 63 passes along an optical path different from the fundamental wave 20 and is output. The harmonic 65 passes along an optical path different from a harmonic 64 generated by the fundamental wave 20 propagating from left to right in FIG. 8. Since the incident surface of the wavelength conversion element 62 is wedged, two harmonic beams are automatically generated without adjusting an inserting angle of the wavelength conversion element 62.

Normally, in the case of arranging a wavelength conversion element in the optical resonator 2, the wavelength conversion element is arranged on a flat surface like an element fixing portion 66 in FIG. 8. In the case of using the wavelength conversion element 62 having the wedged incident surface as in the fifth embodiment, an output can be stabilized by placing the wavelength conversion element on the flat surface of the element fixing portion 66.

Since the incident surface of the wavelength conversion element 62 is wedged, an output variation caused by the interference of the fundamental wave and the harmonic in the optical resonator 2, which is likely to be observed when a parallel plate is inserted, can be suppressed. In order to suppress the interference in the optical resonator 2, an angle of inclination of the incident surface of the wavelength conversion element 62 with respect to a plane perpendicular to an optical axis of the fundamental wave 20 may be about 0.4° to 2°. If the angle of inclination is below 0.4°, interference is likely to occur. On the other hand, if the angle of inclination is larger than 2°, conversion efficiency is likely to decrease. In other words, the harmonic output is likely to decrease.

In this way, if a grinding angle of the one surface of the wavelength conversion element 62 with respect to the plane perpendicular to the optical axis of the fundamental wave 20 lies in a range of 0.4° to 2°, the harmonic output can be stabilized without being reduced.

Although the wedged surface is the incident surface, on which the harmonic reflective coat 63 is formed, in the fifth embodiment, the present invention is not particularly limited to this. A wavelength conversion element having an obliquely ground emergent surface opposite to an incident surface may be arranged in the optical resonator 2. Further, both incident and emergent surfaces may be obliquely ground, so that a wavelength conversion element has a trapezoidal cross-sectional shape.

It is good to grind the wavelength conversion element 62 obliquely with respect to a Z axis (depth direction of the polarization reversal region) of a substrate material. Although the same effect as the above can be obtained even if a wavelength conversion element is ground obliquely with respect to a direction other than the Z axis, it is good to grind the wavelength conversion element obliquely with respect to the Z axis as shown in FIG. 8 if mass productivity is considered.

Since the wavelength conversion element 62 is produced by cutting a wafer into a bar, grinding end surfaces of the bar and cutting the bar, the length of the wavelength conversion element differs if the bar is obliquely ground in a direction different from a Z-axis direction of the wavelength conversion element 62 shown in FIG. 8. If the bar is obliquely ground with respect to the Z axis, identically shaped wavelength conversion elements can be obtained from the bar.

In this way, either one of the incident and emergent surfaces of the wavelength conversion element 62 is so ground as not to be parallel with the other surface, and the harmonic reflective coat 63 for reflecting a harmonic is formed on the one surface.

Accordingly, the optical axis of the harmonic 65 reflected by the harmonic reflective coat 63 and that of the fundamental wave 20 differ, wherefore the interference of the fundamental wave reversely converted from the harmonic and the original fundamental wave can be prevented and the harmonic output can be stabilized.

As described above, it is possible to separate harmonics only by inserting the wavelength conversion element 62 into the optical resonator 2 as in the fifth embodiment, and not only the stabilization of the harmonic output is realized, but also the interference of the fundamental waves in the optical resonator 2 can be prevented. Therefore, the easily controllable solid-state laser device 1d is realized.

Sixth Embodiment

In this sixth embodiment is described an example in which a wavelength conversion element, which is formed with a plurality of polarization reversal regions with different periods and either one of incident and emergent surfaces of which is obliquely ground, is inserted in an optical resonator.

Figure 9:
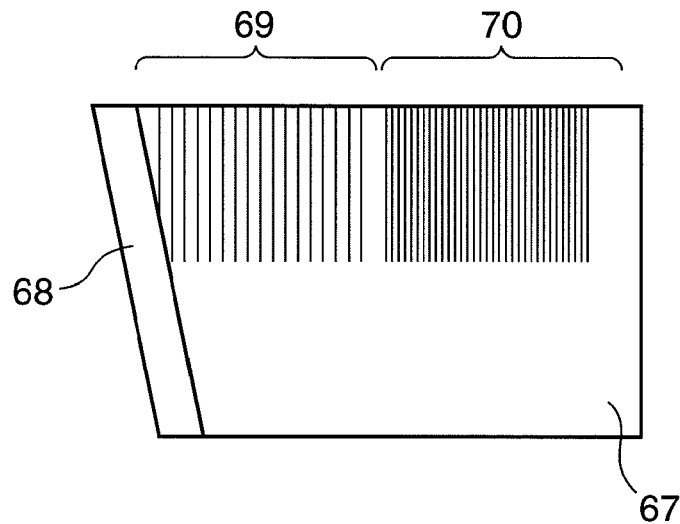
FIG. 9 is a diagram showing the construction of a solid-state laser device according to a sixth embodiment of the invention.

FIG. 9 is a diagram showing the construction of a wavelength conversion element 67 used in a solid-state laser device according to the sixth embodiment of the present invention.

The wavelength conversion element 67 used in this sixth embodiment has either one of the incident and emergent surfaces thereof obliquely ground as in the fifth embodiment and has a harmonic reflective coat 68 formed on the obliquely ground surface. As shown in FIG. 9, the wavelength conversion element 67 is formed with a first polarization reversal region 69 and a second polarization reversal region 70 with a period different from that of the first polarization reversal region 69.

Figure 10:
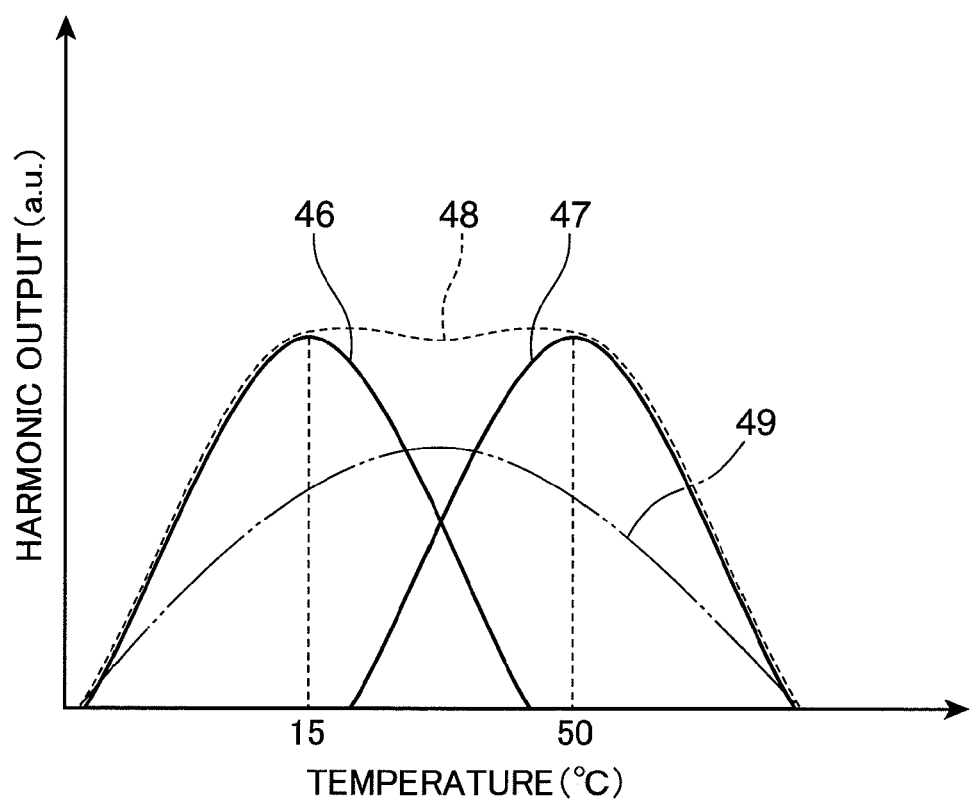
FIG. 10 is a graph showing temperature characteristics of a wavelength conversion element including a plurality of polarization reversal regions with different periods.

FIG. 10 is a graph showing temperature characteristics of a wavelength conversion element including a plurality of polarization reversal regions with different periods. In FIG. 10, a horizontal axis represents temperature and a vertical axis represents harmonic output. A temperature characteristic 46 of a harmonic output in the first polarization reversal region 69 and a temperature characteristic 47 of a harmonic output in the second polarization reversal region 70 are as shown in FIG. 10. The first and second polarization reversal regions 69, 70 are respectively formed to maximize their conversion efficiencies at different temperatures.

In the sixth embodiment, the first polarization reversal region 69 is so designed as to maximize its conversion efficiency at 15° C. and the second polarization reversal region 70 is so designed as to maximize its conversion efficiency at 50° C. A temperature characteristic 48 as the sum of the temperature characteristic 46 of the harmonic output in the first polarization reversal region 69 and the temperature characteristic 47 of the harmonic output in the second polarization reversal region 70 can reduce an output variation in a wide temperature range. If the wavelength conversion element 67 of the sixth embodiment is used, the output variation is suppressed in a light source temperature range from 15° C. to 50° C., wherefore a control for output stabilization can be easily executed.

Since the wavelength conversion element 67 is formed with the plurality of polarization reversal regions (first polarization reversal region 69 and second polarization reversal region 70) with different periods as described above, a usable temperature range can be enlarged.

By being inserted into the optical resonator 2 as described in the second embodiment, the wavelength conversion element 67 including the plurality of polarization reversal regions with different periods and used in the sixth embodiment has better effects as compared with the case of a wavelength conversion by another method such as a one-pass method or a waveguide method.

Further, in the case of forming a plurality of polarization reversal regions with different periods as in the sixth embodiment, conversion efficiency can be increased as compared with the case where a temperature width is enlarged in a polarization reversal region with a single period. A temperature characteristic 49 shown in FIG. 10 indicates a temperature change of a harmonic output when a temperature range is widened in a polarization reversal region with a single period. In the case of widening a temperature range in a polarization reversal region with a single period as shown in FIG. 10, the length of a wavelength conversion element needs to be shortened, wherefore conversion efficiency decreases. By forming the plurality of polarization reversal regions with different periods to increase the conversion efficiency, a characteristic variation of the harmonic reflective coat 68 added to the wavelength conversion element 67 can be permitted. Since an improvement in the conversion efficiency leads to an improvement in the electrical/optical conversion efficiency of the solid-state laser device, the amount of generated heat is reduced and heat of a device including the solid-state laser device can be more easily radiated.

Although the two polarization reversal regions with different periods are used in the sixth embodiment, effects similar to the above can be obtained even when there are three or more polarization reversal regions with different periods or the period of the polarization reversal region is continuously changed.

As described above, since the output variation can be suppressed in a wide temperature range in the sixth embodiment, the stabilization of the harmonic output can be realized even without executing a highly accurate temperature control using a Peltier element or the like, which is effective in reducing cost and power consumption.

Seventh Embodiment

In this seventh embodiment is described an example in which a plurality of wavelength conversion elements each formed with a harmonic reflective coat are obliquely inserted in an optical resonator.

Figure 11:
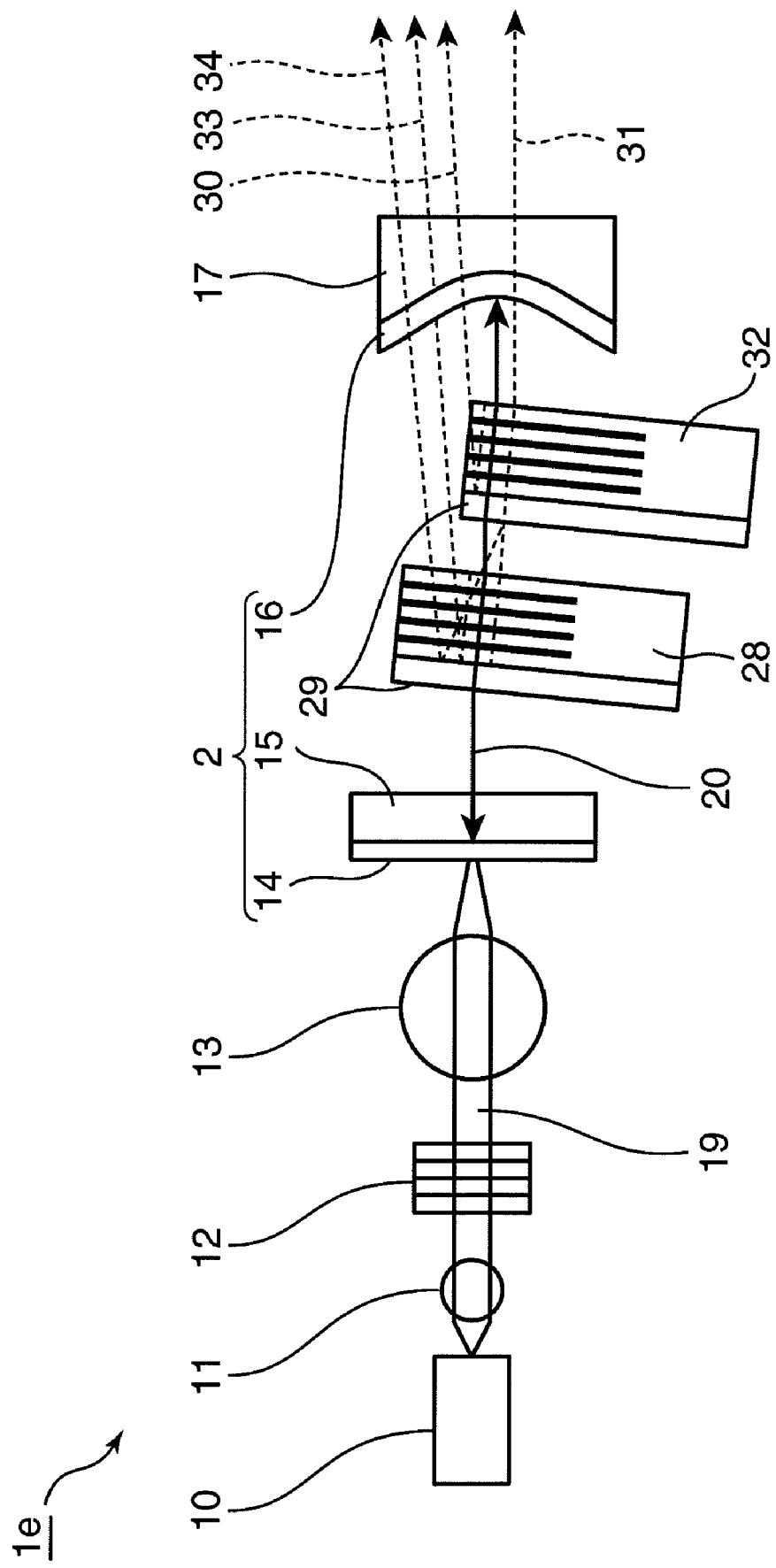
FIG. 11 is a diagram showing the construction of a solid-state laser device according to a seventh embodiment of the invention.

FIG. 11 is a diagram showing the construction of a solid-state laser device according to the seventh embodiment of the present invention. A solid-state laser device 1e shown in FIG. 11 is provided with a semiconductor laser light source 10, a rod lens 11, a VBG 12, a ball lens 13, an optical resonator 2, a concave mirror 17 and wavelength conversion elements 28, 32.

In the seventh embodiment, the wavelength conversion elements 28, 32 each formed with a harmonic reflective coat are inserted in the optical resonator 2 as shown in FIG. 11. Four harmonic beams are output by inserting the two wavelength conversion elements 28, 32 in the optical resonator 2. In other words, four harmonics 30, 31, 33 and 34 are output from the solid-state laser device 1e. As the number of harmonics increases, light intensity can be more easily uniformized in a uniformizing optical system. In addition, in the case of using this solid-state laser device 1e in a backlight of a liquid crystal display, a plurality of harmonic beams are output from the solid-state laser device 1e, wherefore light is more easily uniformized in a light guide plate.

By making a polarization reversal period different between the wavelength conversion elements 28 and 32, an output variation can be suppressed in a wider temperature range. The reason for this is same as in the second embodiment. By the construction of the seventh embodiment, harmonic intensities can be more easily uniformized and, in addition, a harmonic output variation can be suppressed in a wide temperature range.

As described above, since the polarization reversal periods of the plurality of wavelength conversion elements 28, 32 are different in the seventh embodiment, a usable temperature range can be enlarged while the stabilization of the harmonic output is realized. Further, since the plurality of wavelength conversion elements 28, 32 are inserted in the optical resonator 2, the number of harmonic beams to be output increases and the light quantity of output beams can be easily uniformized. As a result, this solid-state laser device 1e can be used in a backlight of a liquid crystal display.

Although two wavelength conversion elements 28 shown in FIG. 7 are arranged side by side in an optical axis direction in the seventh embodiment, the present invention is not particularly limited to this and two wavelength conversion elements 62 shown in FIG. 8 may be arranged side by side in the optical axis direction.

Eighth Embodiment

In this eighth embodiment is described an example in which harmonic reflective coats are formed on both incident and emergent surfaces of a wavelength conversion element to generate a plurality of harmonics for output stabilization.

Figure 12:
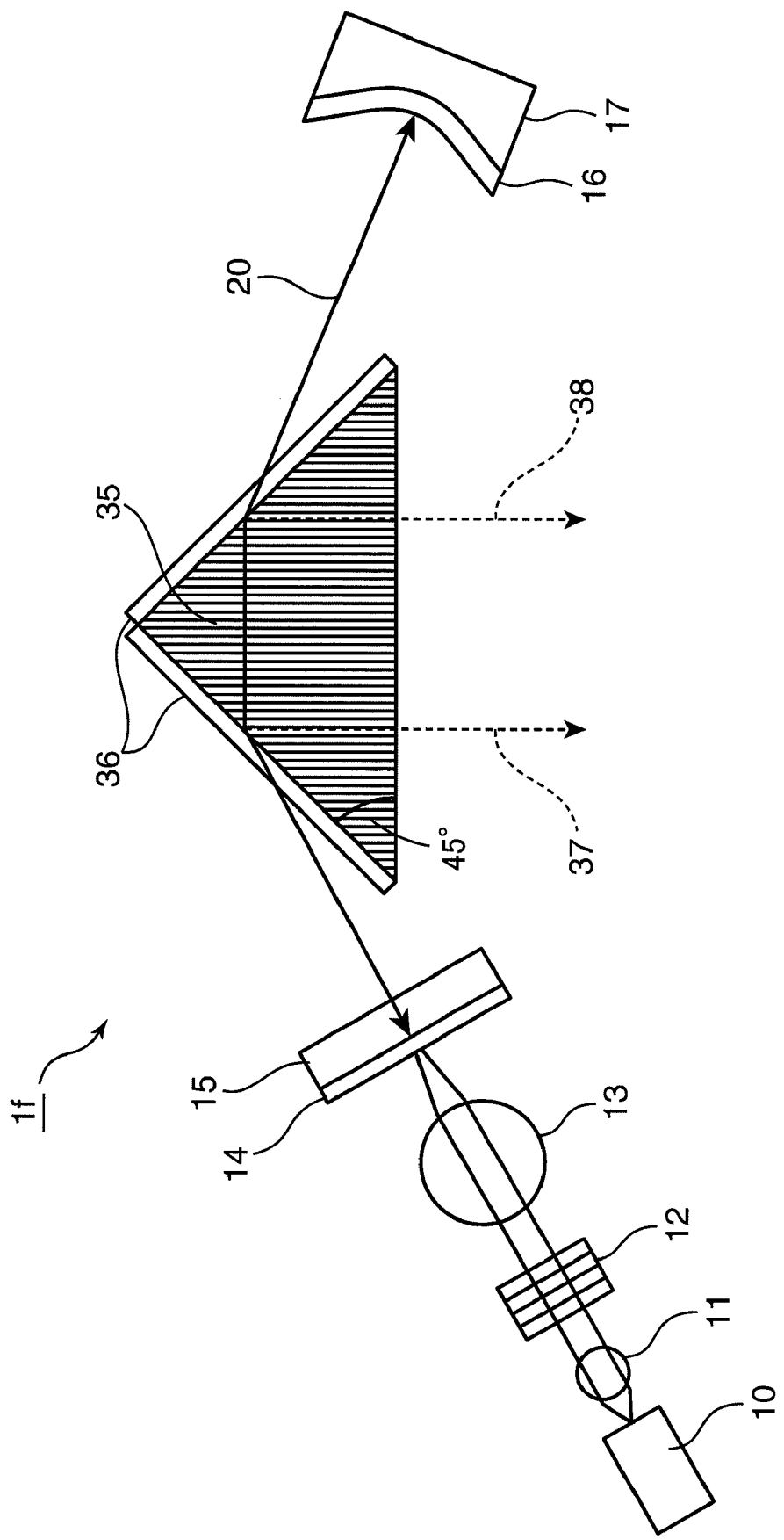
FIG. 12 is a diagram showing the construction of a solid-state laser device according to an eighth embodiment of the invention.

FIG. 12 is a diagram showing the construction of a solid-state laser device according to the eighth embodiment of the present invention. A solid-state laser device 1f shown in FIG. 12 is provided with a semiconductor laser light source 10, a rod lens 11, a VBG 12, a ball lens 13, an optical resonator 2, a concave mirror 17 and a wavelength conversion element 35. A basic construction of the solid-state laser device 1f of the eighth embodiment is similar to that of the solid-state laser device 1a of the first embodiment, but differs in the shape of the wavelength conversion element 35.

The wavelength conversion element 35 used in the eighth embodiment has a triangular cross-sectional shape. Incident and emergent surfaces of the wavelength conversion element 35 are ground at an angle of 45°. The incident and emergent surfaces of the wavelength conversion element 35 are added with harmonic reflective coats 36 for reflecting no fundamental wave, but highly reflecting harmonics. A harmonic 38 generated by the fundamental wave 20 propagating from left to right in FIG. 12 is reflected by the harmonic reflective coat 36 and output from the wavelength conversion element 35. Similarly, a harmonic 37 generated by the fundamental wave 20 propagating from right to left in FIG. 12 is reflected by the harmonic reflective coat 36 and output from the wavelength conversion element 35.

The wavelength conversion element 35 may have a cross-sectional shape other than a triangular shape and it is obvious that similar effects can be obtained even if a trapezoidal cross-sectional shape is employed.

As described above, the cross-sectional shape of the wavelength conversion element 35 is triangular or trapezoidal, and the harmonics are reflected by the harmonic reflective coats 36 formed on the incident and emergent surfaces of the wavelength conversion element 35. Accordingly, the generated harmonics are not reversely converted into fundamental waves, wherefore the stabilization of the harmonic output is realized. Further, a plurality of harmonics 37, 38 to be output can be made parallel. Since the generated harmonics 37, 38 are output in parallel in the same direction, harmonics can be easily optically handled in the case of installing this solid-state laser device if in another device.

Further, a usable temperature range is enlarged as in the above embodiments if a plurality of polarization reversal regions with different periods are formed in the wavelength conversion element.

Ninth Embodiment

In this ninth embodiment is described an example in which a wavelength conversion element formed with a plurality of polarization reversal regions with different periods and having both incident and emergent surfaces obliquely ground is inserted in an optical resonator.

Figure 13:
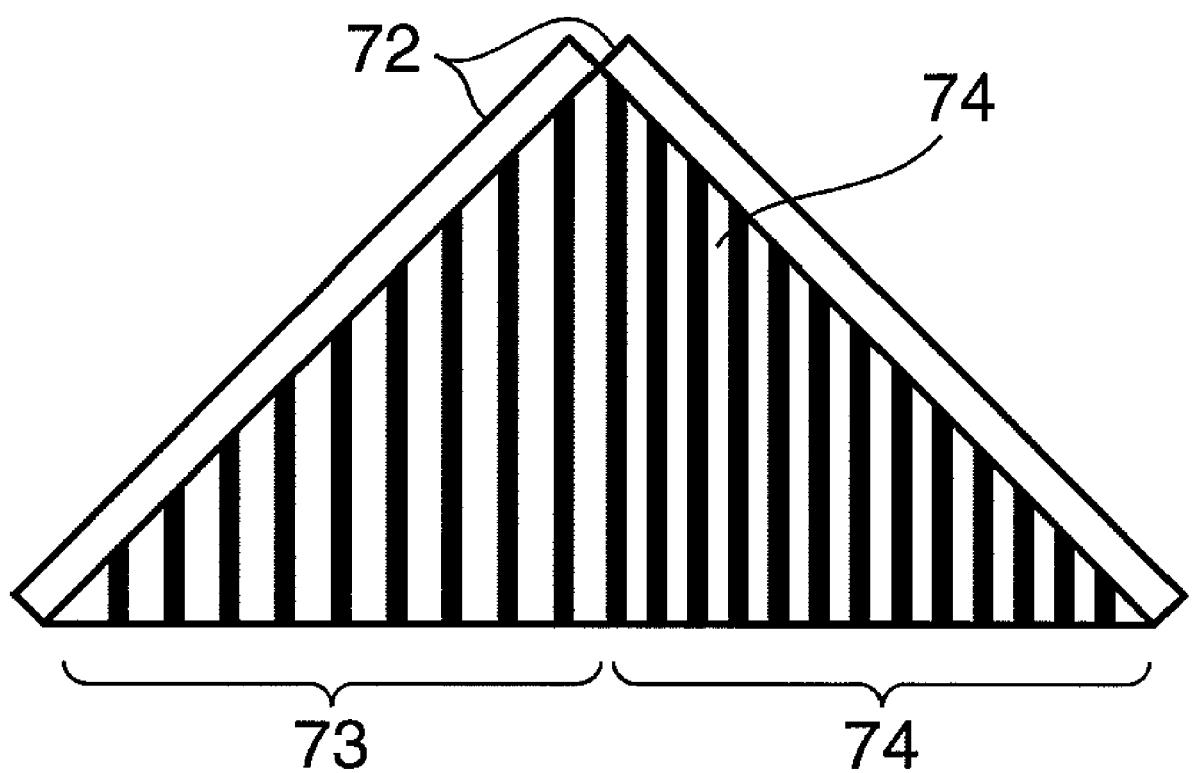
FIG. 13 is a diagram showing the construction of a wavelength conversion element used in a solid-state laser device according to a ninth embodiment of the invention.

FIG. 13 is a diagram showing the construction of a wavelength conversion element 71 used in a solid-state laser device according to the ninth embodiment of the present invention. The wavelength conversion element 71 used in the ninth embodiment has both incident and emergent surfaces obliquely ground as in the eighth embodiment and is formed with harmonic reflective coats 72 on the both obliquely ground surfaces. As shown in FIG. 13, the wavelength conversion element 71 is formed with a first polarization reversal region 73 and a second polarization reversal region 74 with a period different from that of the first polarization reversal region 73.

The first and second polarization reversal regions 73, 74 are respectively formed to maximize their conversion efficiencies at different temperatures. In the ninth embodiment, the first polarization reversal region 73 is so designed as to maximize its conversion efficiency at 15° C. and the second polarization reversal region 74 is so designed as to maximize its conversion efficiency at 50° C. A temperature characteristic as the sum of a temperature characteristic of a harmonic output in the first polarization reversal region 73 and a temperature characteristic of a harmonic output in the second polarization reversal region 74 can reduce an output variation in a wide temperature range. If the wavelength conversion element 71 of the ninth embodiment is used, the output variation is suppressed in a light source temperature range from 15° C. to 50° C., wherefore a control for output stabilization can be easily executed.

In this way, the wavelength conversion element 71 is formed with the plurality of polarization reversal regions (first and second polarization reversal regions 73, 74) with different periods, wherefore a usable temperature range can be enlarged.

By being inserted in the optical resonator 2 as described in the second embodiment, the wavelength conversion element 71 including the plurality of polarization reversal regions with different periods and used in the ninth embodiment has better effects as compared with the case of a wavelength conversion by another method such as a one-pass method or a waveguide method.

Further, in the case of forming a plurality of polarization reversal regions with different periods as in the ninth embodiment, conversion efficiency can be increased as compared with the case where a temperature width is enlarged in a polarization reversal region with a single period. In the case of enlarging a temperature range in a polarization reversal region with a single period, the length of a wavelength conversion element needs to be shortened, wherefore conversion efficiency decreases. By forming the plurality of polarization reversal regions with different periods to increase the conversion efficiency, a characteristic variation of the harmonic reflective coat 72 added to the wavelength conversion element 71 can be permitted. Since an improvement in the conversion efficiency leads to an improvement in the electrical/optical conversion efficiency of the solid-state laser device, the amount of generated heat is reduced and heat of a device including the solid-state laser device is more easily radiated.

Although the two polarization reversal regions with different periods are used in the ninth embodiment, effects similar to the above can be obtained even when there are three or more polarization reversal regions with different periods or the period of the polarization reversal region is continuously changed.

As described above, since the output variation can be suppressed in a wide temperature range in the ninth embodiment, the stabilization of the harmonic output can be realized even without executing a highly accurate temperature control using a Peltier element or the like, which is effective in reducing cost and power consumption.

Tenth Embodiment

In this tenth embodiment is described an example in which speckle noise, which is problematic when the solid-state laser devices described in the first to ninth embodiments are employed in image display devices, is reduced. Upon applying a light source using a solid-state laser device capable of wavelength conversion to a laser display device, interference is likely to occur since wavelength widths of harmonics are short. As a result, speckle noise, which makes a displayed image look glaring, is generated to reduce image quality.

Figure 14:
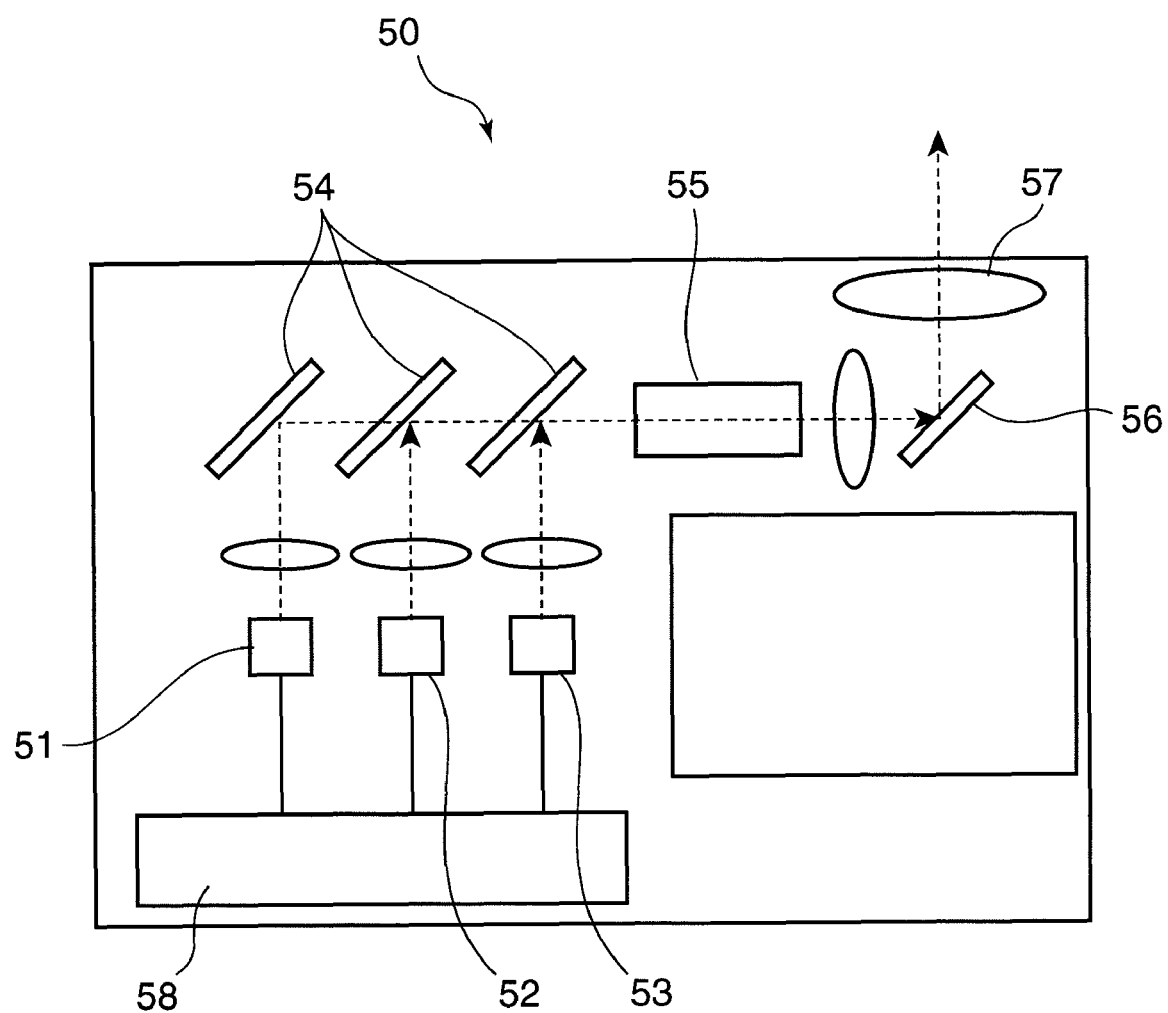
FIG. 14 is a diagram showing a schematic construction of an image display device according to a tenth embodiment of the invention.

FIG. 14 is a diagram showing a schematic construction of an image display device according to the tenth embodiment of the present invention. An image display device 50 is provided with a red light source 51, a blue light source 52, a solid-state laser device 53 as a green light source, a dichroic minor 54, a uniformizing optical system 55, a two-dimensional spatial modulation device 56, an exit lens 57 and a control circuit 58.

The red and blue light sources 51 and 52 are constructed by semiconductor lasers. Laser beams output from the respective color light sources pass through the uniformizing optical system 55 after being reflected by the dichroic mirror 54. The laser beams uniformized by the uniformizing optical system 55 are incident on the two-dimensional spatial modulation device 56. The two-dimensional spatial modulation device 56 in the tenth embodiment is constructed by a DMD (Digital Mircomirror Device). The laser beams incident on the two-dimensional spatial modulation device 56 are reflected in accordance with a video signal and output as a video image from the exit lens 57. The control circuit 58 controls the outputs of the red light source 51, the blue light source 52 and the solid-state laser device 53.

Figure 15:
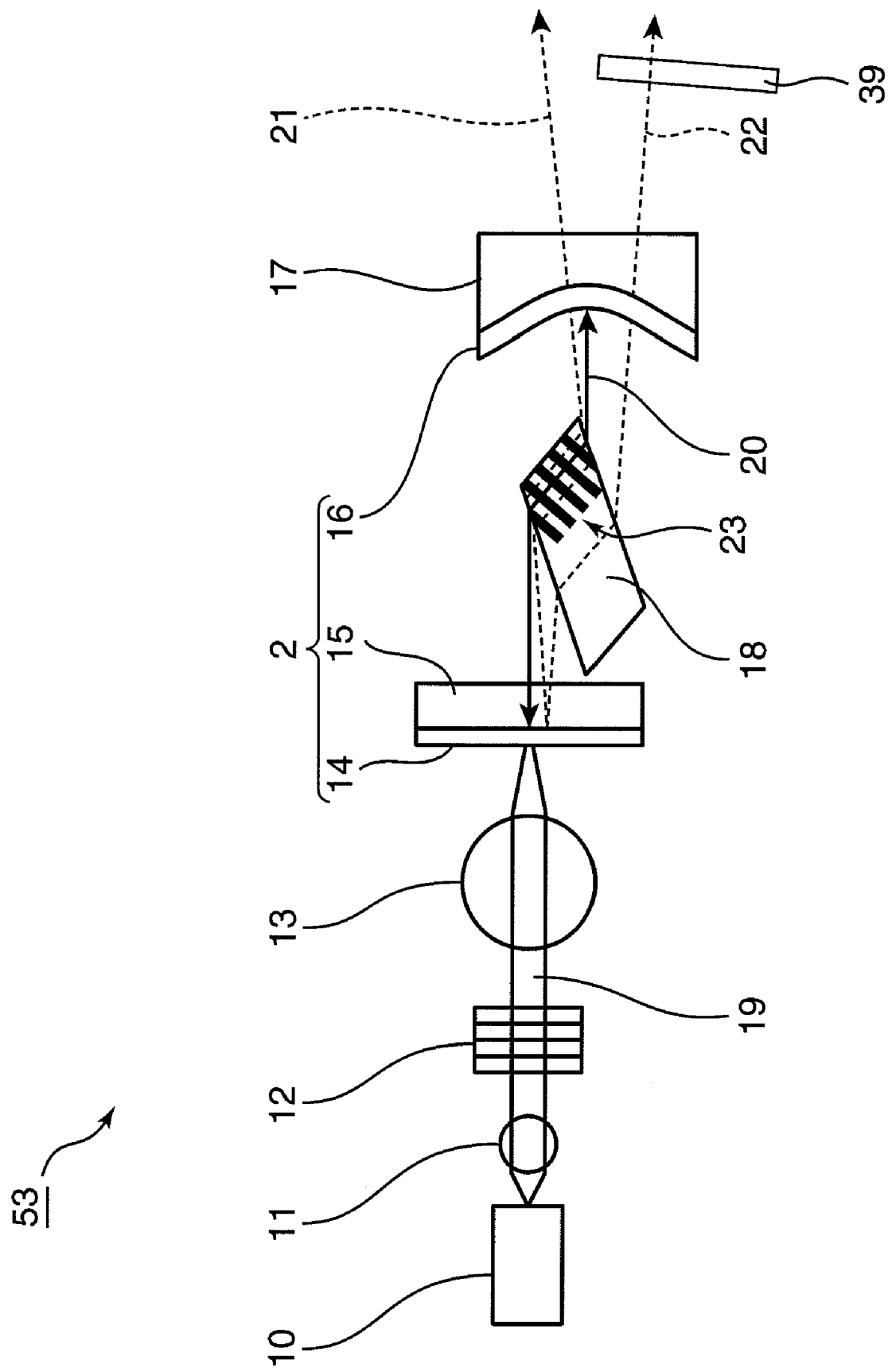
FIG. 15 is a diagram showing the construction of a solid-state laser device according to the tenth embodiment of the invention.

FIG. 15 is a diagram showing the construction of the solid-state laser device 53 installed in the image display device according to the tenth embodiment of the present invention. The solid-state laser device 53 shown in FIG. 15 is provided with a semiconductor laser light source 10, a rod lens 11, a VBG 12, a ball lens 13, an optical resonator 2, a concave mirror 17, a wavelength conversion element 18 and a half wave plate 39. A basic construction of the solid-state laser device 53 shown in FIG. 15 is identified by the same reference numerals since being identical to the solid-state laser device 1a of the above first embodiment.

The tenth embodiment differs from the first embodiment in that, out of two harmonics 21, 22 to be generated, a polarization direction of the harmonic 22 is rotated by the half wave plate 39. Speckle noise can be reduced by rotating the polarization direction of one out of the two harmonic beams to be output. As compared with the case of not rotating the polarization direction of the one harmonic beam, speckle noise could be reduced approximately to 1/1.5 and an intensity variation of a green beam to be generated caused by the speckle noise could be reduced.

In this way, the half wave plate 39 rotates the polarization direction of at least one of a plurality of harmonics to be output from the wavelength conversion element 18. Since beams having different polarization directions are output from the solid-state laser device 53, speckle noise can be reduced.

In the image display device of the tenth embodiment, the two-dimensional spatial modulation device 56 is constructed by the DMD using a mirror. This is because the rotation of the polarization direction can be almost ignored by using the mirror. A device using a MEMS (Micro Electro Mechanical Systems) mirror other than the DMD can provide equivalent effects.

In the case of scanning a laser beam using a MEMS mirror or the like, two separate beams may be projected after being combined into one. A plurality of harmonics are output also in the first to ninth embodiments. Speckle noise can be reduced if a polarization direction of at least one of harmonics to be output is rotated.

Since speckle noise can be reduced in the tenth embodiment, an image display device with high image quality is realized.

Although the solid-state laser device 53 of the tenth embodiment is constructed by adding the half wave plate 39 to the solid-state laser device 1a of the first embodiment, the present invention is not particularly limited to this and the half wave plate 39 may be added to the solid-state laser devices of the second to ninth embodiments. In this case, the half wave plate rotates a polarization direction of at least one of a plurality of harmonics output from the concave mirror 17 or the wavelength conversion element 35.

As described above, the solid-state laser devices of the first to tenth embodiment can be applied to the image display device 50, whereby the harmonic output can be stabilized and a plurality of harmonics can be utilized without increasing the number of parts. Further, since a plurality of beams having different polarization directions are output from the solid-state laser device 53 and reflected by the two-dimensional spatial modulation device 56, it is possible to display a high-quality image with little speckle noise.

Eleventh Embodiment

In this eleventh embodiment is described a liquid crystal display device using a solid-state laser device and a liquid crystal panel as a two-dimensional spatial modulation element. The solid-state laser device is used in a light source for a backlight of a liquid crystal display.

Figure 16:
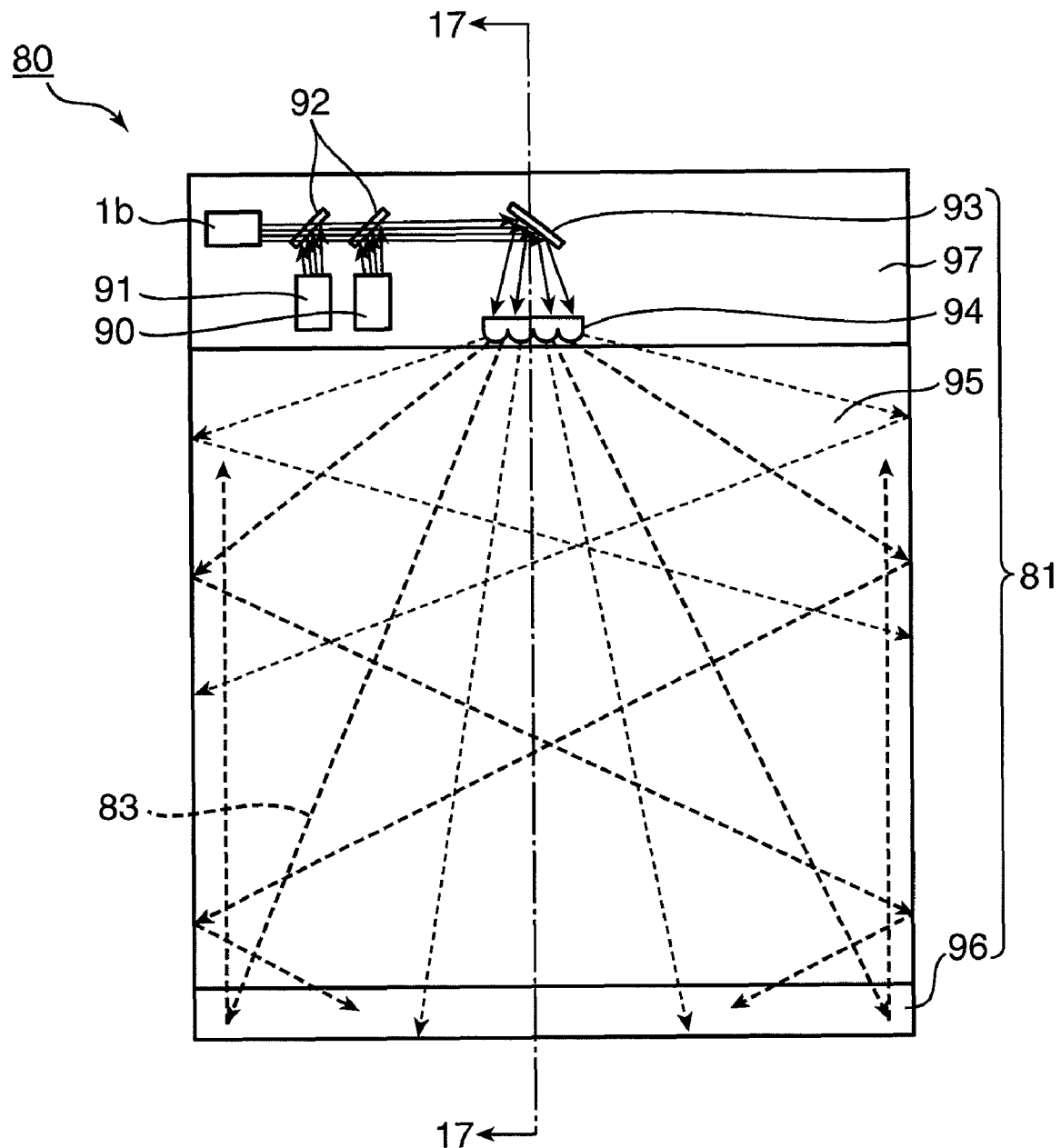
FIG. 16 is a plan view of an image display device according to an eleventh embodiment of the invention when viewed from a backlight unit side.
Figure 17:
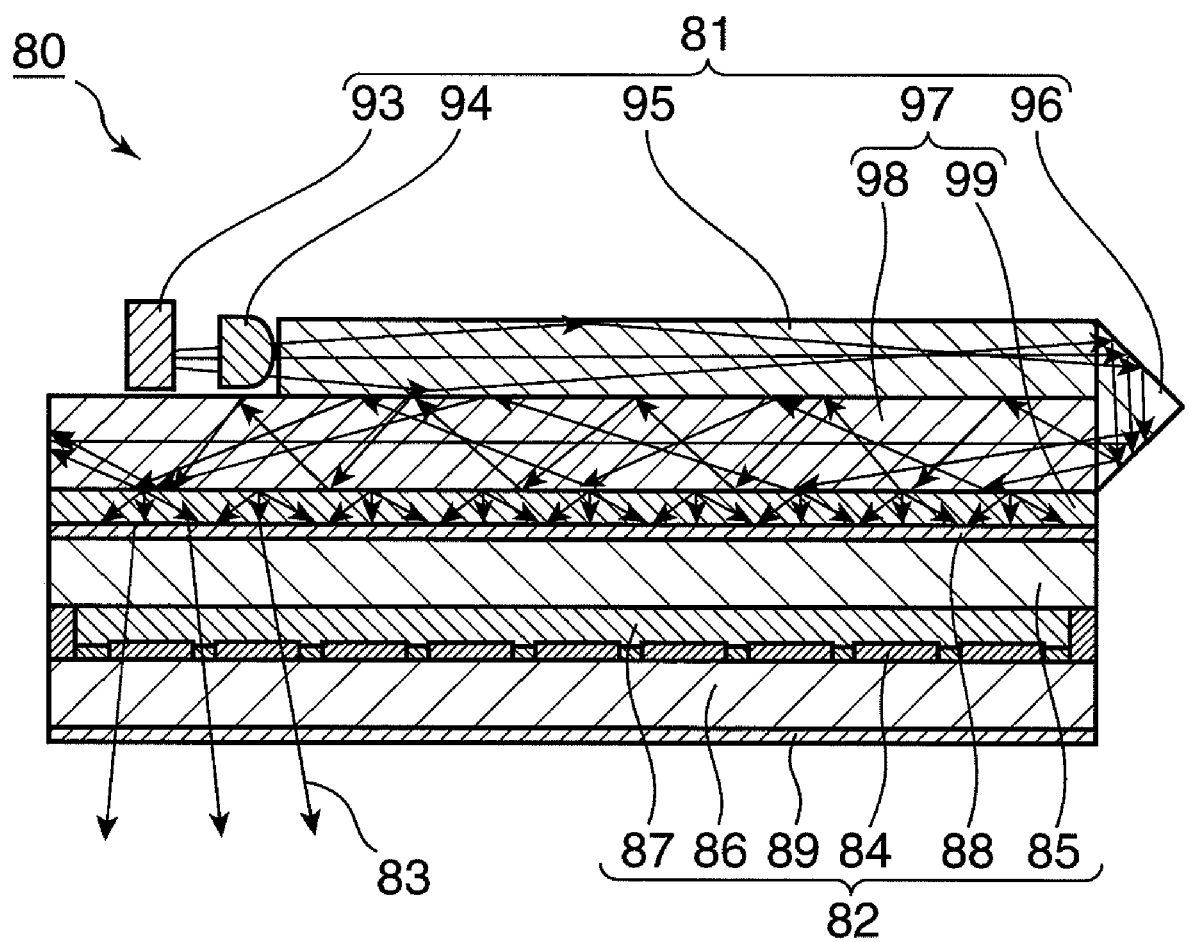
FIG. 17 is a section along a line 17-17 of FIG. 16.
Figure 18:
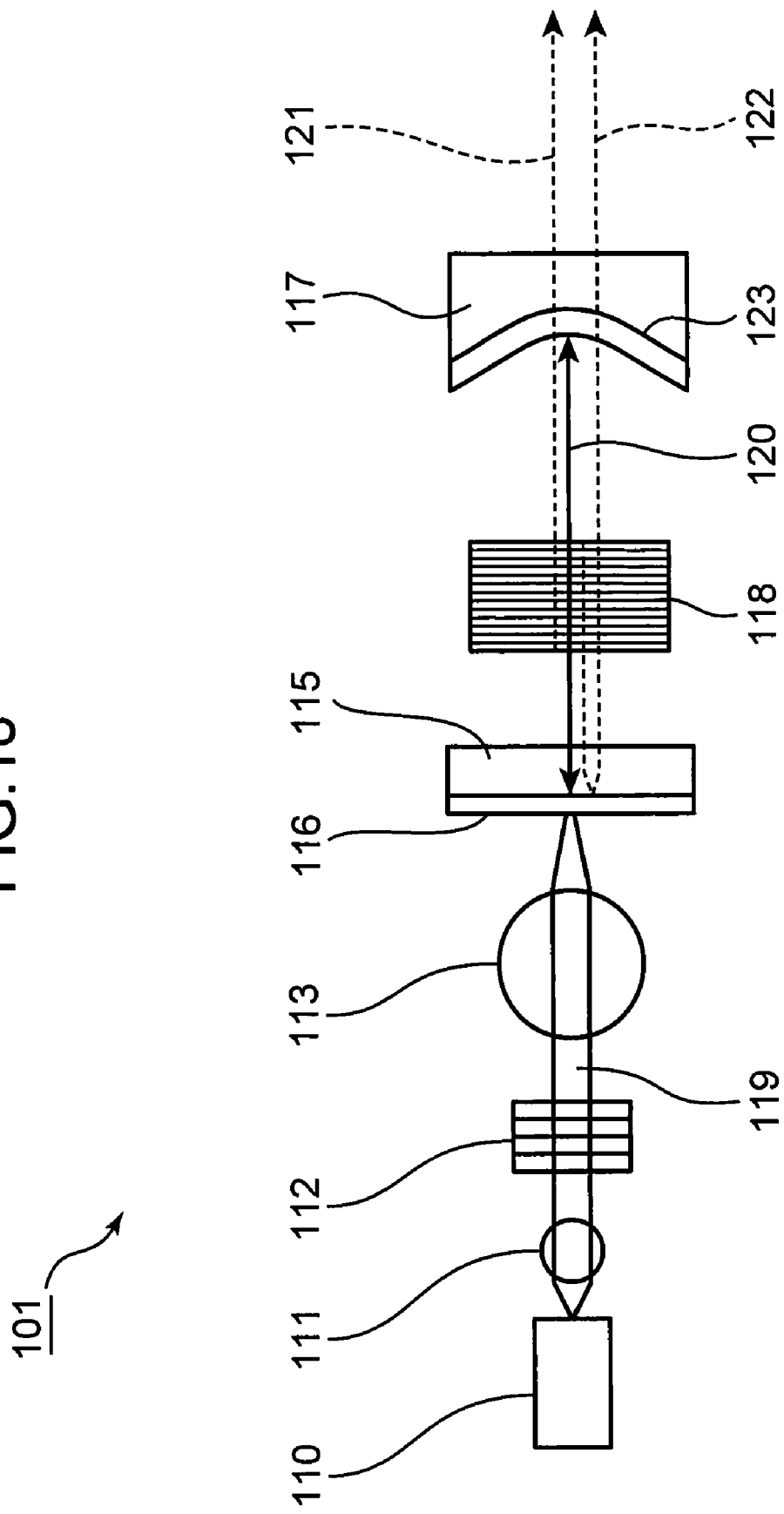
FIG. 18 is a diagram showing the construction of a conventional solid-state laser device.
Figure 19:
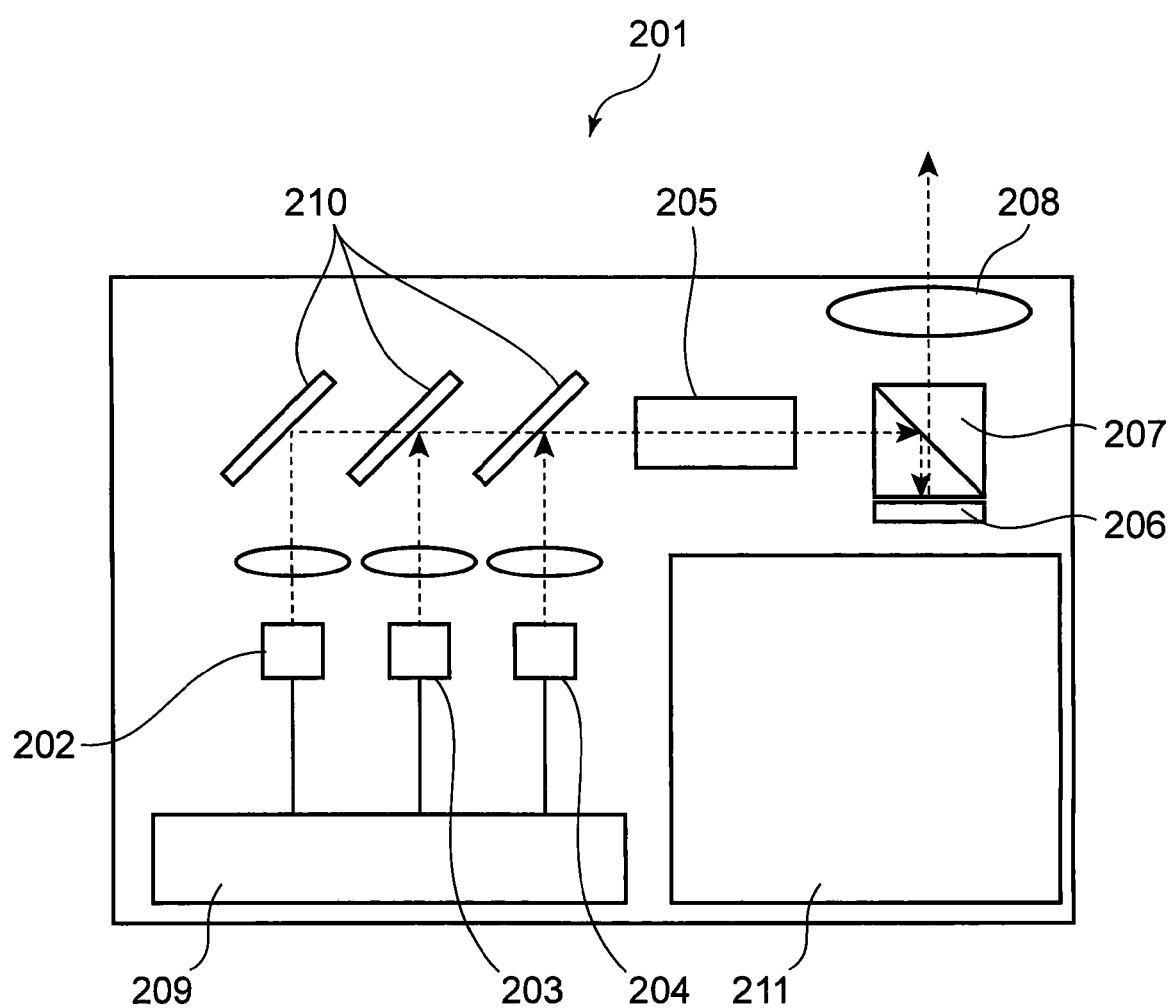
FIG. 19 is a diagram showing a schematic construction of a conventional image display device.
Figure 20:
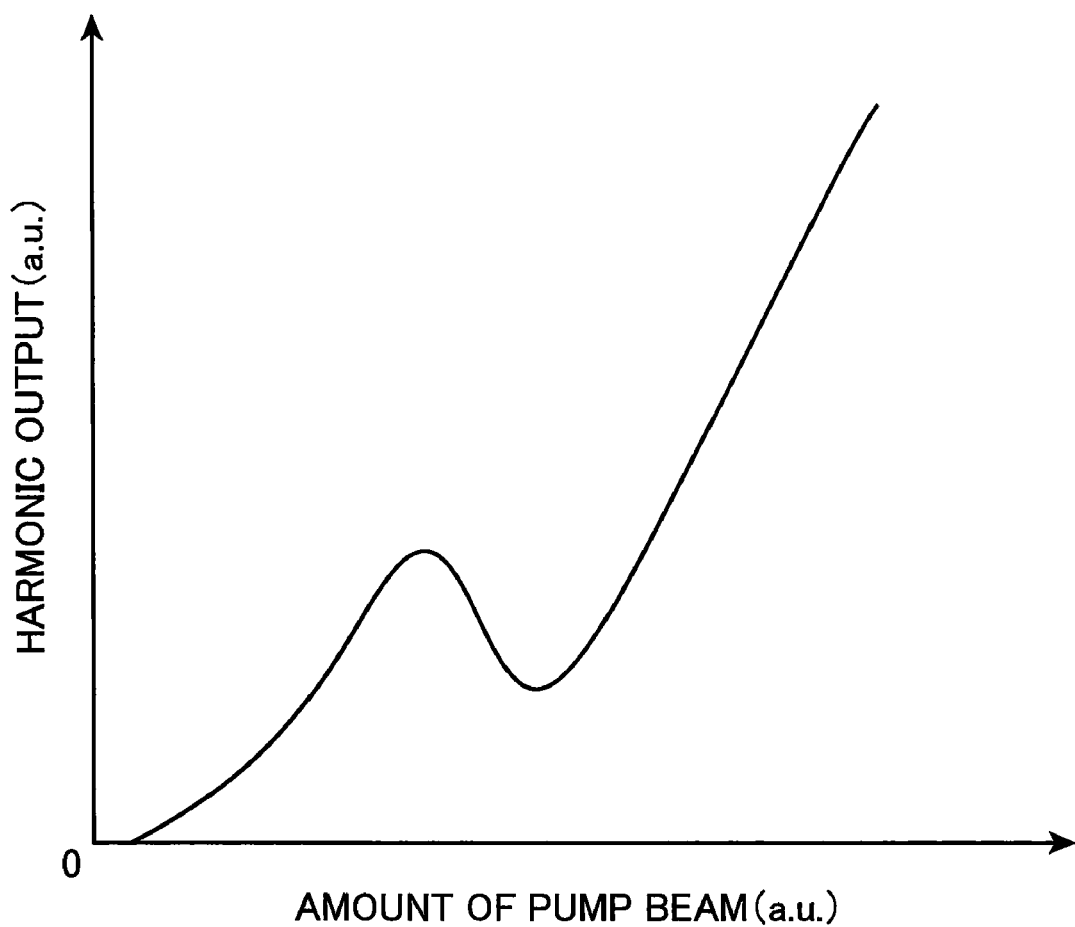
FIG. 20 is a graph showing destabilization of a harmonic output caused by reverse conversion of a harmonic into a fundamental wave in an optical resonator.
Figure 21:
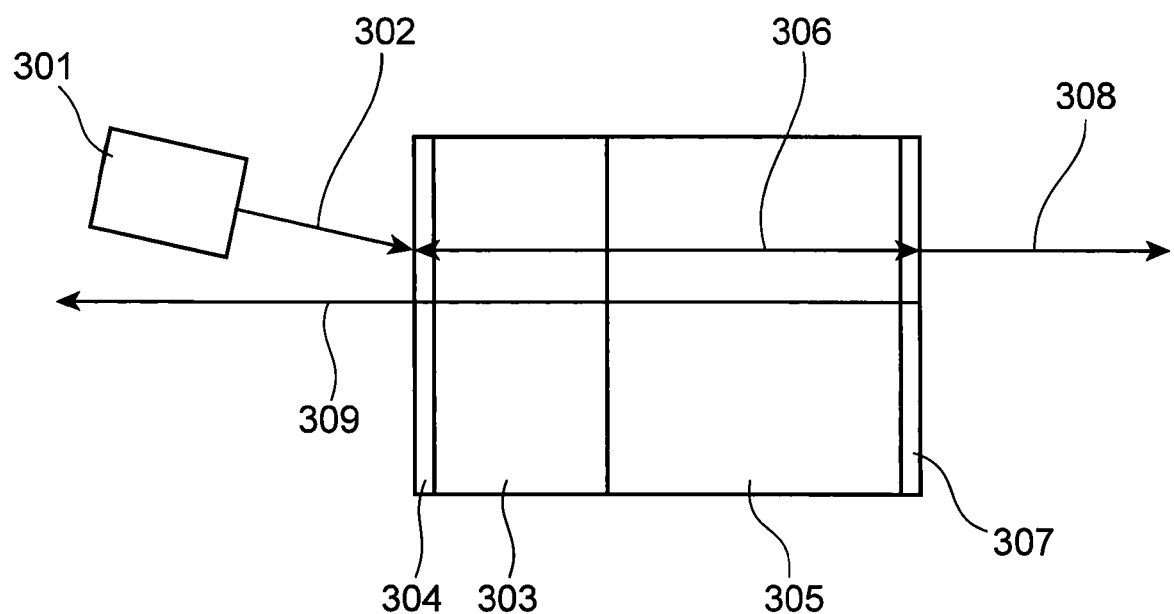
FIG. 21 is a diagram showing the construction of a conventional solid-state laser device realizing harmonic output stability

FIGS. 16 and 17 are diagrams showing the construction of an image display device 80 according to the eleventh embodiment of the present invention. FIG. 16 is a plan view of the image display device 80 according to the eleventh embodiment of the present invention when viewed from a backlight unit 81, and FIG. 17 is a section along a line 17-17 of FIG. 16.

The image display device 80 is provided with a solid-state laser device 1b, a red light source 90, a blue light source 91, a dichroic mirror 92, a liquid crystal panel 82 as an example of a two-dimensional spatial modulation element and a backlight unit 81 for irradiating the liquid crystal panel 82. The backlight unit 81 irradiates the entire surface of the liquid crystal panel 82 with illuminating laser beams 83 emitted from the red light source 90, the solid-state laser device 1b (green light source) and the blue light source 91.

The liquid crystal panel 82 is of the transmissive or semi-transmissive type and, for example, a TFT (Thin Film Transistor) active matrix liquid crystal panel. A multitude of pixels 84 each composed of a red pixel portion, a green pixel portion and a blue pixel portion are provided in a display region and driven by TFTs. A liquid crystal layer 87 is disposed between two glass substrates 85 and 86. The liquid crystal layer 87 is driven by unillustrated TFTs formed on either one of the glass substrates 85, 86. Further, polarizing plates 88, 89 are provided on surfaces of the glass substrates 85, 86.

The liquid crystal panel 82 of the eleventh embodiment is not described any further since being the same as a conventional construction as described above.

In the image display device 80 shown in FIGS. 16 and 17, the solid-state laser device 1b of the third embodiment is used as the green light source and four beams as shown in FIG. 5 are output. Semiconductor laser light sources are used as the red and blue light sources 90 and 91. These semiconductor laser light sources are so constructed as to output a plurality of beams, and output four beams similar to the solid-state laser device 1b. In order to output a plurality of beams from the red and blue light sources 90, 91, a method using a plurality of semiconductor lasers for each color, a method for forming a multi-stripe structure and the like can be employed.

Next, the construction of the backlight unit 81 used in the image display device 80 is described. The backlight unit 81 is arranged on the rear surface of the liquid crystal panel 82. The shape of the backlight unit 81 is substantially the same as that of the liquid crystal panel 82. The backlight unit 81 includes a reflecting mirror 93, a microlens array 94, a converting light guide plate 95, an optical path changer 96, a light guide plate 97 on one end surface of which light is to be incident, a first light guide plate 98 and a second light guide plate 99.

Red, blue and green beams output from the red light source 90, the blue light source 91 and the solid-state laser device 1b are combined into an illuminating laser beam 83 by the dichroic mirror 92 and incident on the reflecting mirror 93. The illuminating laser beam 83 reflected by the reflecting mirror 93 is spread by the microlens array 94 and incident on the converting light guide plate 95.

The illuminating laser beam 83 incident on the converting light guide plate 95 is reflected and diffused by the outer circumferential surface and incident on the optical path changer 96 to have a direction thereof changed, and is then incident on the first light guide plate 98 of the light guide plate 97. The illuminating laser beam 83 is reflected and diffused in the first light guide plate 98 and incident on the second light guide plate 99. The illuminating laser beam 83 is further diffused in the second light guide plate 99 to have a uniform luminance distribution as a whole. Thereafter, the illuminating laser beam 83 is emitted from the second light guide plate 99 to illuminate the liquid crystal panel 82. In this way, the liquid crystal panel 82 is illuminated to display an image.

In this case, each of red light, blue light and green light emitted from the red light source 90, the blue light source 91 and the solid-state laser device 1b is composed of four beams in a direction parallel with a surface of the converting light guide plate 95. Accordingly, it is possible to spread the illuminating laser beam 83 by an optical system simpler than before and cause the illuminating laser beam 83 to be incident on the entire surface of the converting light guide plate 95, and an image display device with a large screen can be easily realized. Further, since it is also possible to reduce speckle noise, a high-quality video image can be displayed. Also in a backlight unit having a construction different from the eleventh embodiment, it is obvious that a solid-state laser device for emitting a plurality of separate beams is effective in uniformizing light in the backlight unit.

Although the image display device 80 according to the eleventh embodiment includes the solid-state laser device 1b of the third embodiment, the present invention is not particularly limited to this and the solid-state laser device of any one of the first, second, forth to tenth embodiments may be included instead of the solid-state laser device 1b of the third embodiment.

Although the solid-state laser device is used as the light source for the image display device in the tenth and eleventh embodiments, the solid-state laser devices of the first to ninth embodiments have many merits of being able to stabilize an output and enlarge a drive temperature range, obviating the need for a highly accurate temperature control, and being able to reduce speckle noise. Thus, the solid-state laser devices of the first to ninth embodiments are not limited to use as the light source for the image display device shown in the above two tenth and eleventh embodiments and can be effectively used as a light source of every type of image display device with a wide color reproduction range.

The solid-state laser devices of the first to ninth embodiments have remarkably good effects even when being used as a light source for a projection type image display device using a transmissive liquid crystal panel or a reflective liquid crystal panel as a two-dimensional spatial modulation device. Since the solid-state laser devices of the first to ninth embodiments can be miniaturized, stabilize an output, enlarge a drive temperature range and obviate the need for a highly accurate temperature control, a Peltier element or the like is unnecessary. Thus, power consumption is drastically reduced, wherefore a portable image display device with low power consumption can also be realized.

The above specific embodiments mainly include inventions having the following constructions.

A solid-state laser device according to one aspect of the present invention comprises a semiconductor laser light source for emitting a laser beam for pumping; an optical resonator including a solid laser crystal to be excited by the incidence of a laser beam to oscillate a fundamental wave and a pair of mirrors arranged at the opposite sides of the solid laser crystal; and a wavelength conversion element for converting the fundamental wave into harmonics, wherein the wavelength conversion element is so arranged in the optical resonator that the optical axis of at least one of a plurality of harmonics generated in the optical resonator is made different from that of the fundamental wave and the at least one harmonic whose optical axis is made different is output substantially in the same direction as the other harmonic.

According to this construction, the semiconductor laser light source emits a laser beam for pumping. The optical resonator includes the solid laser crystal to be excited by the incidence of a laser beam to oscillate a fundamental wave and the pair of mirrors arranged at the opposite sides of the solid laser crystal. The wavelength conversion element converts the fundamental wave into harmonics. The wavelength conversion element is so arranged in the optical resonator that the optical axis of the at least one of the plurality of harmonics generated in the optical resonator is made different from that of the fundamental wave and the at least one harmonic whose optical axis is made different is output substantially in the same direction as the other harmonic.

Since the optical axis of the at least one of the plurality of harmonics generated in the optical resonator and that of the fundamental wave are different, it is possible to prevent the interference of a fundamental wave reversely converted from the harmonic and the initial fundamental wave and stabilize a harmonic output. Further, since the at least one harmonic is output substantially in the same direction as the other harmonic, a plurality of harmonics can be utilized without increasing the number of parts.

In the above solid-state laser device, it is preferable that incident and emergent surfaces of the wavelength conversion element are obliquely ground; and that the wavelength conversion element is inserted at a Brewster angle in the optical resonator. According to this construction, a light quantity loss in the optical resonator can be reduced since the wavelength conversion element is inserted at the Brewster angle in the optical resonator.

In the above solid-state laser device, the wavelength conversion element is preferably formed with a plurality of polarization reversal regions with different periods. According to this construction, a usable temperature range can be enlarged since the wavelength conversion element is formed with the plurality of polarization reversal regions with different periods.

In the above solid-state laser device, it is preferable that the wavelength conversion element includes a plurality of wavelength conversion elements, and that the plurality of wavelength conversion elements are inserted in the optical resonator. According to this construction, it is possible to increase the number of beams to be output and easily uniformize the light quantities of the beams to be output since the plurality of wavelength conversion elements are inserted in the optical resonator.

In the above solid-state laser device, polarization reversal periods of the plurality of wavelength conversion elements are preferably respectively different. According to this construction, a usable temperature range can be enlarged since the polarization reversal periods of the plurality of wavelength conversion elements are respectively different.

In the above solid-state laser device, a grinding angle of the wavelength conversion element is preferably 25±5°. According to this construction, the depth of the polarization reversal region can be made smaller and the polarization reversal region can be easily formed since the wavelength conversion element is ground at an angle of 25±5°.

In the above solid-state laser device, it is preferable that a reflective coat for reflecting a harmonic is formed on either one of incident and emergent surfaces of the wavelength conversion element, and that the light incident surface of the wavelength conversion element is inclined at a specified angle with respect to a plane perpendicular to the optical axis of the fundamental wave.

According to this construction, it is possible to prevent the interference of a fundamental wave reversely converted from the harmonic and the initial fundamental wave and stabilize a harmonic output since the optical axis of the harmonic reflected by the reflective coat and that of the fundamental wave are different.

In the above solid-state laser device, an angle of inclination of the light incident surface of the wavelength conversion element with respect to the plane perpendicular to the optical axis of the fundamental wave is preferably 0.5 to 10°. According to this construction, a harmonic output can be stabilized without being reduced when the angle of inclination of the light incident surface of the wavelength conversion element with respect to the plane perpendicular to the optical axis of the fundamental wave is 0.5 to 10°.

In the above solid-state laser device, it is preferable that either one of incident and emergent surfaces of the wavelength conversion element is so ground as not to be parallel to the other surface; and that a reflective coat for reflecting a harmonic is formed on the one surface.

According to this construction, it is possible to prevent the interference of a fundamental wave reversely converted from the harmonic and the initial fundamental wave and stabilize a harmonic output since the optical axis of the harmonic reflected by the reflective coat and that of the fundamental wave are different.

In the above solid-state laser device, a grinding angle of the one surface of the wavelength conversion element with respect to a plane perpendicular to the optical axis of the fundamental wave is preferably 0.4 to 2°. According to this construction, a harmonic output can be stabilized without being reduced when the grinding angle of the one surface of the wavelength conversion element with respect to the plane perpendicular to the optical axis of the fundamental wave is 0.4 to 2°.

In the above solid-state laser device, the wavelength conversion element is preferably formed with a plurality of polarization reversal regions with different periods. According to this construction, a usable temperature range can be enlarged since the wavelength conversion element is formed with the plurality of polarization reversal regions with different periods.

In the above solid-state laser device, a plurality of wavelength conversion elements are preferably inserted in the optical resonator. According to this construction, it is possible to increase the number of harmonic beams to be output and easily uniformize the light quantities of the beams to be output since the plurality of wavelength conversion elements are inserted in the optical resonator.

In the above solid-state laser device, polarization reversal periods of the plurality of wavelength conversion elements are preferably respectively different. According to this construction, a usable temperature range can be enlarged since the polarization reversal periods of the plurality of wavelength conversion elements are respectively different.

In the above solid-state laser device, it is preferable that the wavelength conversion element has a triangular or trapezoidal cross-sectional shape; and that reflective coats for reflecting a harmonic are formed on incident and emergent surfaces of the wavelength conversion element.

According to this construction, the wavelength conversion element has the triangular or trapezoidal cross-sectional shape, and harmonics are reflected by the reflective coats formed on the incident and emergent surfaces of the wavelength conversion element. Thus, a plurality of harmonics to be output can be made parallel and, hence, harmonics can be optically easily handled.

In the above solid-state laser device, the wavelength conversion element is preferably formed with a plurality of polarization reversal regions with different periods. According to this construction, a usable temperature range can be enlarged since the wavelength conversion element is formed with the plurality of polarization reversal regions with different periods.

In the above solid-state laser device, it is preferable to further comprise a wave plate for rotating a polarization direction of at least one of a plurality of harmonics output from the wavelength conversion element. According to this construction, speckle noise can be reduced since harmonics having different polarization directions are output from the solid-state laser device.

An image display device according to another aspect of the present invention comprises the above solid-state laser device, and a two-dimensional spatial modulation device for modulating an emitted beam output from the solid-state laser device. According to this construction, it is possible to apply the above solid-state laser device to an image display device, stabilize a harmonic output and utilize a plurality of harmonics without increasing the number of parts.

An image display device according to still another aspect of the present invention comprises a solid-state laser device for emitting a plurality of harmonics including beams having different polarization directions; and a two-dimensional spatial modulation device for modulating beams emitted from the solid-state laser device, wherein the two-dimensional spatial modulation device reflects the emitted beams. According to this construction, it is possible to display a high-quality image with little speckle noise since a plurality of beams having different polarization directions are emitted from the solid-state laser device and reflected by the two-dimensional spatial modulation device.

INDUSTRIAL APPLICABILITY

A solid-state laser device and an image display device according to the present invention can stabilize a harmonic output and utilize a plurality of harmonics without increasing the number of parts, and are useful for an internal resonator type solid-state laser device including a solid laser crystal and a wavelength conversion element and an image display device using this solid-state laser device. The solid-state laser device according to the present invention is very useful as a light source for an image display device with a wide color reproduction range.

What is claimed is:

1. A solid-state laser device, comprising:
a semiconductor laser light source for emitting a laser beam for pumping;
an optical resonator including (i) a solid laser crystal for oscillating a fundamental wave by being excited by incidence of a laser beam to oscillate the fundamental wave, and (ii) a pair of mirrors arranged at opposite sides of the solid laser crystal; and
a wavelength conversion element for converting the fundamental wave into harmonics,
wherein a reflective coat for reflecting the harmonics is formed on an end surface of the wavelength conversion element toward the solid laser crystal,
wherein the end surface of the wavelength conversion element, having the reflective coat formed thereon, is inclined at a specified angle with respect to a plane perpendicular to an optical axis of the fundamental wave,
wherein the wavelength conversion element is arranged in the optical resonator so that (i) an optical axis of a harmonic propagating toward the solid laser crystal is made different from the optical axis of the fundamental wave, and (ii) the harmonic, having the optical axis different from the optical axis of the fundamental wave, is output substantially in the same direction as another harmonic,
wherein the end surface of the wavelength conversion element, having the reflective coat formed thereon, is ground obliquely with respect to a Z axis of a substrate material so as not to be parallel with another end surface of the wavelength conversion element through which the fundamental wave passes, and
wherein a grinding angle of the end surface of the wavelength conversion element, having the reflective coat formed thereon, with respect to the plane perpendicular to the optical axis of the fundamental wave is 0.4 to 2°.

2. A solid-state laser device according to claim 1, wherein the wavelength conversion element is formed with a plurality of polarization reversal regions with different periods.

3. A solid-state laser device according to claim 1, wherein a plurality of wavelength conversion elements are inserted in the optical resonator.

4. A solid-state laser device according to claim 3, wherein polarization reversal periods of the plurality of wavelength conversion elements are respectively different.

5. A solid-state laser device according to claim 1,
wherein the wavelength conversion element has a triangular or trapezoidal cross-sectional shape, and
wherein reflective coats for reflecting a harmonic are formed on incident and emergent surfaces of the wavelength conversion element.

6. A solid-state laser device according to claim 5, wherein the wavelength conversion element is formed with a plurality of polarization reversal regions with different periods.

7. An image display device, comprising:
a solid-state laser device according to claim 1; and
a two-dimensional spatial modulation device for modulating an emitted beam output from the solid-state laser device.

* * * * *